(12) United States Patent
Kosecoff et al.

(10) Patent No.: US 11,793,290 B2
(45) Date of Patent: Oct. 24, 2023

(54) ADDRESSABLE ELECTROACTIVE POLYMER ARRAYS FOR COSMETIC DESIGN APPLICATION

(71) Applicant: L'Oreal, Paris (FR)

(72) Inventors: David B. Kosecoff, San Francisco, CA (US); Franck Giron, Clichy (FR)

(73) Assignee: L'Oreal, Paris (FR)

( * ) Notice: Subject to any disclaimer, the term of this patent is extended or adjusted under 35 U.S.C. 154(b) by 209 days.

(21) Appl. No.: 17/364,427

(22) Filed: Jun. 30, 2021

(65) Prior Publication Data

US 2023/0000232 A1    Jan. 5, 2023

(51) Int. Cl.
*A45D 34/04* (2006.01)
*G01S 17/89* (2020.01)

(52) U.S. Cl.
CPC ........ *A45D 34/04* (2013.01); *A45D 2200/205* (2013.01); *G01S 17/89* (2013.01)

(58) Field of Classification Search
CPC ............ A45D 34/04; A45D 44/005; A45D 2200/205; G01S 17/89
See application file for complete search history.

(56) References Cited

U.S. PATENT DOCUMENTS

| 11,006,726 | B1 | 5/2021 | Liu | |
|---|---|---|---|---|
| 2017/0069052 | A1 | 3/2017 | Li | |
| 2020/0275758 | A1* | 9/2020 | Miller | A45D 33/02 |
| 2023/0000241 | A1* | 1/2023 | Kosecoff | A45D 34/041 |

FOREIGN PATENT DOCUMENTS

| CA | 2466682 | * | 5/2003 | ....... G02F 1/134336 |
|---|---|---|---|---|
| KR | 20210100846 | * | 8/2021 | ............. A45D 34/04 |
| WO | 2020/260515 A1 | | 12/2020 | |

OTHER PUBLICATIONS

Rapport De Recherche Preliminaire, mailed Jul. 18, 2022, issued in corresponding French Application No. 2108898, filed Aug. 25, 2021, 2 pages.
Opinion Ecrite Sur La Brevetable De L'Invention, mailed Jul. 18, 2022, issued in corresponding French Application No. 2108898, filed Aug. 25, 2021, 4 pages.

(Continued)

*Primary Examiner* — J C Jacyna
(74) *Attorney, Agent, or Firm* — Christensen O'Connor Johnson Kindness PLLC

(57) ABSTRACT

Devices, systems, and methods are provided for applying a cosmetic design to a biological subject. An applicator array device may include a substrate. The applicator array device may include a plurality of applicator elements disposed on the substrate, together defining an applicator array. Each applicator element may include a first electrode, an electroactive polymer layer disposed on the first electrode, and a second electrode, disposed on the electroactive polymer layer. The applicator array device may also include an applicator surface overlying the applicator array. Each applicator element may be configured to switch between a first position and a second position upon application of a voltage to the first electrode or the second electrode, or upon removal of the voltage from the first electrode or the second electrode.

12 Claims, 11 Drawing Sheets

(56) References Cited

OTHER PUBLICATIONS

International Search Report and Written Opinion, dated Oct. 21, 2022, issued in corresponding International Application No. PCT/US2022/035692, filed Jun. 30, 2022, 14 pages.
Bar-Cohen, Electroactive polymers for refreshable Braille displays, SPIE, Sep. 11, 2009.
Stretchable Inks for Wearable Electronics, Dupont, Electronic Solutions, 2021.
Worrell et al., Bistable and photoswitchable states of matter, Nature Communications, 2018.

\* cited by examiner

ADDRESSABLE ELECTROACTIVE POLYMER ARRAYS FOR COSMETIC DESIGN APPLICATION

SUMMARY

Devices, systems, and methods are provided for applying a cosmetic design to a biological subject. An applicator array device may include a substrate. The applicator array device may include a plurality of applicator elements disposed on the substrate, together defining an applicator array. Each applicator element may include a first electrode, an electroactive polymer layer disposed on the first electrode, and a second electrode, disposed on the electroactive polymer layer. The applicator array device may also include an applicator surface overlying the applicator array. Each applicator element may be configured to switch between a first position and a second position upon application of a voltage to the first electrode or the second electrode, or upon removal of the voltage from the first electrode or the second electrode.

In some embodiments, the applicator surface may include a perforated screen comprising a plurality of windows corresponding to the plurality of applicator elements, the perforated screen having a thickness whereby the applicator elements are recessed below an outer surface of the perforated screen at the first position and are proud of the outer surface when at the second position.

In some embodiments, the plurality of applicator elements may be disposed on a first side of the substrate. The applicator array may include a plurality of pistons operably coupled to the plurality of applicator elements and extending through the substrate. The applicator surface may include a flexible layer disposed on a second side of the substrate and overlying the plurality of pistons and the substrate. Each applicator element may be configured to switch from the first position to the second position upon application of the voltage. The substrate may include a flexible material. The first electrode and the second electrode may include flexible electronic traces. The applicator surface may include a porous material disposed at a plurality of positions corresponding to the plurality of applicator elements. The applicator array device may further include a pigment reservoir fluidly coupled with the applicator surface and configured to saturate the porous material using a liquid pigment from the pigment reservoir. Each applicator element may further include a plurality of electroactive polymer layers including the electroactive polymer layer, interleaved with a plurality of first electrodes including the first electrode and a plurality of second electrodes including the second electrode, together defining a stack of electroactive polymer cells.

A system for application of cosmetic designs may include a client computing device configured to generate a cosmetic design. The system may include an applicator array device as previously described, in electronic communication with the client computing device, configured to receive the cosmetic design from the client computing device and to initialize the plurality of applicator elements of the applicator array device in accordance with the cosmetic design. The system may also include a pigment applicator configured to reversibly couple with the applicator array device and to apply a pigment to a subset of the plurality of applicator elements.

In some embodiments, the pigment applicator may include control circuitry, communication circuitry, and a controllable pigment applicator head. The pigment applicator may be configured to electronically couple with the client computing device. The pigment applicator may be configured to print the pigment onto the subset of the plurality of applicator elements, using the controllable pigment applicator head, in accordance with the cosmetic design. The applicator array device may be further configured to receive the cosmetic design from the client computing device via an electronic coupling with the pigment applicator. The pigment may be or include a bistable formulation, wherein the bistable formulation switches between a solid or viscous form and a liquid form when exposed to illumination at a characteristic energy.

In some embodiments, the system may further include a camera in communication with the client computing device. Generating the cosmetic design may include capturing an image describing a target body surface using the camera. Generating the cosmetic design may include generating a surface mapping of the target body surface using the image. Generating the cosmetic design may also include determining a subset of applicator elements of the plurality of applicator elements to switch from the first position to the second position.

A method for applying a cosmetic design to a biological subject may include receiving a design at an applicator array device, the applicator array device comprising a plurality of applicator elements. The method may include initializing the plurality of applicator elements in accordance with the design. Initializing the plurality of applicator elements may include applying a voltage to a subset of the applicator elements or removing the voltage from the subset of the applicator elements.

In some embodiments, each applicator element of the plurality of applicator elements may include a first electrode, an electroactive polymer layer disposed on the first electrode, and a second electrode, disposed on the electroactive polymer layer. Each applicator element may be configured to switch between a first position and a second position upon application of the voltage to the first electrode or the second electrode or upon removal of the voltage from the first electrode or the second electrode.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Figure 1:
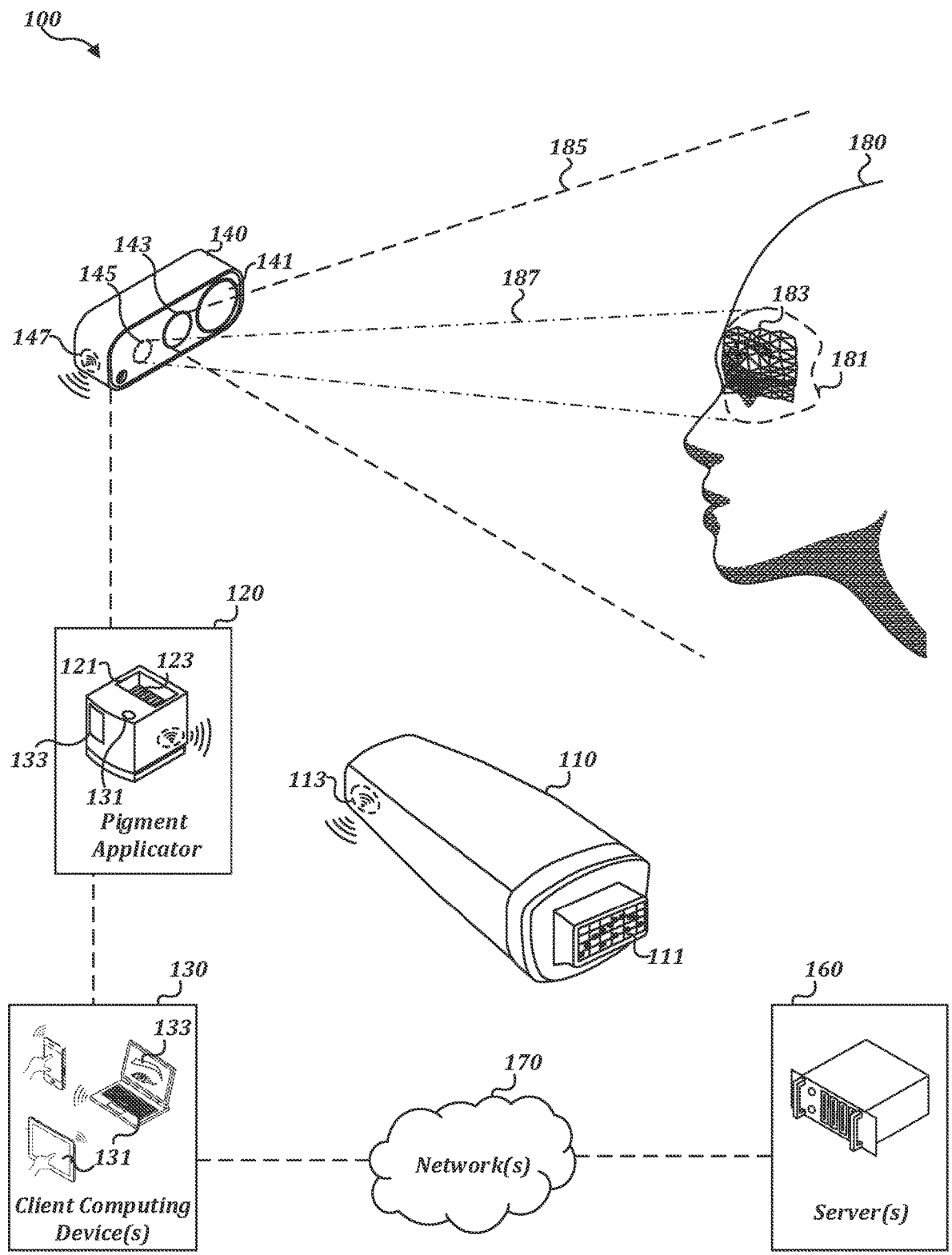
FIG. 1 is a schematic illustration of an embodiment of a system for application of cosmetic designs, in accordance with various embodiments.

The foregoing aspects and many of the attendant advantages of this invention will become more readily appreciated as the same become better understood by reference to the following detailed description, when taken in conjunction with the accompanying drawings.

In the above-referenced drawings, like reference numerals refer to like parts throughout the various views unless otherwise specified. Not all instances of an element are necessarily labeled to simplify the drawings where appropriate. The drawings are not necessarily to scale, emphasis instead being placed upon illustrating the principles being described.

DETAILED DESCRIPTION

Application of cosmetics and makeup in patterns and shapes can be difficult by hand. For example, intricate designs and theatrical makeup are typically applied by certified makeup professionals. Additionally, self-application can be a challenge generally for those with limited mobility or vision. Currently, handheld tools, such as cartridge-plus-dispenser solutions, typically implement printed and/or patterned makeup application through a unitary printing head to apply the final design directly to the skin. Despite representing a technological alternative to brushes, such tools are limited by cartridge sizes, cleaning methods, inability to mix or blend colors, short battery life, and lack of location awareness. Also, by depending on a handheld device, such tools do not address accessibility concerns.

Techniques are described for applying a cosmetic design guide to a target body surface of a biological subject, such as a subject's face or other region of interest, using an applicator array device. Described embodiments employ electroactive polymer circuits to initialize an applicator array including multiple applicator elements. Subsequent initialization, a pigment may be selectively applied to those applicator elements that are proud of or otherwise raised from an applicator surface. Transferring the cosmetic design guide to the target body surface aids in the application of cosmetics in accordance with a cosmetic design. The techniques, therefore, improve the manual application of cosmetics.

Described embodiments include using image sensors to define one or more contour mappings of the target body surface using a 3D mapping of the target body surface. Described embodiments are useful in many contexts, including cosmetics or body art applications, skin feature mapping or monitoring, dermatological diagnosis or treatments, or telehealth applications. In the context of such applications, described embodiments provide precision and greater ease of use over complex manual routines.

The forthcoming description focuses on embodiments of a system for applying cosmetic designs and/or cosmetic design guides, but embodiments are not limited as such. In some embodiments, the systems, methods, and materials described include techniques for applying cosmetic treatments to a target body surface. The cosmetic treatments may include, but are not limited to, cosmetic treatments directed at reducing the appearance of skin lines, wrinkles, loose skin, acne, scars, or other aesthetic treatments. The cosmetic treatments may be implemented through application of active ingredients additionally or alternatively to cosmetic pigments. For example, devices described herein may apply ultraviolet-absorber material, antipruritic material, and/or antiseptic materials, as part of a cosmetic design to conceal and treat features including, but not limited to blemishes, acne, cuts, or scars. In this way, the cosmetic treatments may impart similar cosmetic benefits as treatments employing both cosmetic formulations and active ingredients.

FIG. 1 is a schematic illustration of an example system 100 for application of cosmetic designs, in accordance with various embodiments. The example system 100 includes an applicator array device 110, a pigment applicator 120, one or more client computing devices 130, a camera 140, and one or more remote computer systems 160, also referred to as server(s). As part of the example system 100, the constituent system components may be operably coupled through wireless communication and/or through wired communication. In some embodiments, constituent components may communicate directly through wireless pairing (e.g., Bluetooth) and/or via a local wireless network (e.g., through a wireless router). In some embodiments, constituent components may communicate over one or more networks 170, which may be or include a public network (e.g., the internet) or a private network (e.g., an intranet). In this way, the example system 100 may include multiple distinct devices configured to communicate electronic information through wireless connections. Additionally or alternatively, some of the constituent components may be integrated into a single device.

As an illustrative example, the pigment applicator 120 may integrate the client computing device 130 and/or the camera 140. Similarly, the client computing device 130 may incorporate the camera 140 and/or the pigment applicator 120. Similarly, the example system 100 may include multiple client computing devices 130, where a first client computing device 130 is a mobile electronic device (e.g., a tablet, smartphone, or laptop) that is configured to host user interface elements and to connect to the server(s) 160 over the network(s) 170, while a second client computing device 130 is integrated with the pigment applicator 120 and the camera 140 and is configured to coordinate the operation of the applicator array device 110 with the first client computing device 130. As described in more detail in reference to FIG. 10, the constituent components of the example system 100 may be provided with computer-executable instructions (e.g., software, firmware, etc.) to implement and coordinate the operation of one or more features of the example system 100. In this way, the operation of the example system 100 may be coordinated via a user interface, accessed via one or more of the constituent components.

As described in more detail in reference to FIGS. 2-10, the applicator array device 110 may incorporate electronic components including, but not limited to, control circuitry, power supply circuitry, and communication circuitry. In some embodiments, the applicator array device 110 receives a cosmetic design from one or more constituent components of the example system 100 and initializes an applicator array 111 in accordance with the cosmetic design. The applicator array device 110 may receive the cosmetic design through communication with one or more of the constituent components of the example system 100, for example, through wireless communication circuitry 113, including but not limited to a near-field radio transmitter/receiver (e.g., WiFi, Bluetooth, etc.), an infrared optical link, or other data transmission techniques. In some embodiments, the applicator array device 110 may receive the cosmetic design(s) from the client computing device 130. In some embodiments, the applicator array device 110 may receive the cosmetic design(s) from the client computing device 130 via a link with the pigment applicator 120. For example, the applicator array device 110 and the pigment applicator 120 may communicate automatically (e.g., without human intervention) either wirelessly or through a reversible physical coupling (e.g., through communication circuitry including electrical contacts). In this way, cosmetic design data may be transferred either directly to the applicator array device 110 (e.g., over the network 170 or through a wireless pairing with the client computing device(s) 130), or indirectly via the pigment applicator 120.

The applicator array device 110 may include electronic circuitry to individually address multiple applicator elements that together define the applicator array 111, as described in reference to FIGS. 3-9. The applicator elements may include electroactive polymer actuators to switch the applicator elements between a raised position and a neutral or recessed position. In this way, the cosmetic designs received by the applicator array device 110 may be or include an array of binary values (e.g., a "true" value and a "false" value) corresponding to the array of applicator elements. The applicator array device 110 may initialize the applicator array 111 in accordance with the binary values, where each value may correspond to an individual applicator element of the applicator array 111.

The pigment applicator 120 may be or include electronic circuitry and/or mechanical components to selectively apply pigment to one or more applicator elements making up the applicator array 111. In some embodiments, the pigment applicator 120 includes a mechanical coupling 121 that is fitted to receive or otherwise reversibly join with the applicator array 111 and/or the applicator array device 110, such that an operative surface of the applicator array 111 contacts the pigment applicator. For example, the pigment applicator 120 may be or include an applicator 123 including a pigment applicator pad, positioned such that only the applicator element(s) that are in the raised position (e.g., the "true" position in the cosmetic design) are contacted during the reversible coupling with the applicator array device 110. In this way, the pigment applicator 120 may provide a controlled application of pigment to each applicator element that is proud of the operative surface, while leaving applicator elements that remain flush with the operative surface or may be recessed behind the operative surface (e.g., the "false" position in the design) substantially free of pigment. In this context, the term "substantially" is used to describe a condition where a limited or a negligible amount of pigment remains or is deposited on elements not directly contacting the pigment applicator pad. In some embodiments, the mechanical coupling 121 may include charging contacts to transfer electrical power to the applicator array device 110, for example, to charge batteries internal to the applicator array device 110.

In some embodiments, more than one pigment may be applied by the pigment applicator 120. For example, the applicator 123 may include multiple applicator pads corresponding to different colors or types of pigments and may include mechanisms for exchanging the applicator pads between an operative position and an inoperative position. In this way, the pigment applicator 120 may initialize the applicator 123 by selecting an appropriate pigment corresponding to a received cosmetic design but may also change pigments during application of pigment to the applicator array 111.

In some embodiments, the applicator 123 includes a controllable pigment applicator head. The pigment applicator head may be or include a controllable nozzle, ribbon, or other pigment source that is driven to positions in a plane (e.g., using an x-y translation stage) that correspond to the applicator elements of the applicator array 111 that are extended from the operative surface of the applicator array 111. In an illustrative example, the pigment includes charged components, such as ionic species, and the pigment is applied to the applicator element(s) through reversible application of an electric field using the pigment applicator head. In another example, the pigment applicator head may include a ribbon saturated with the pigment that is impacted by a driven tip, such that the ribbon is between the driven tip and the applicator element. Other examples of applicator heads include, but are not limited to, a brush, a roller, or a marker.

Figure 3:
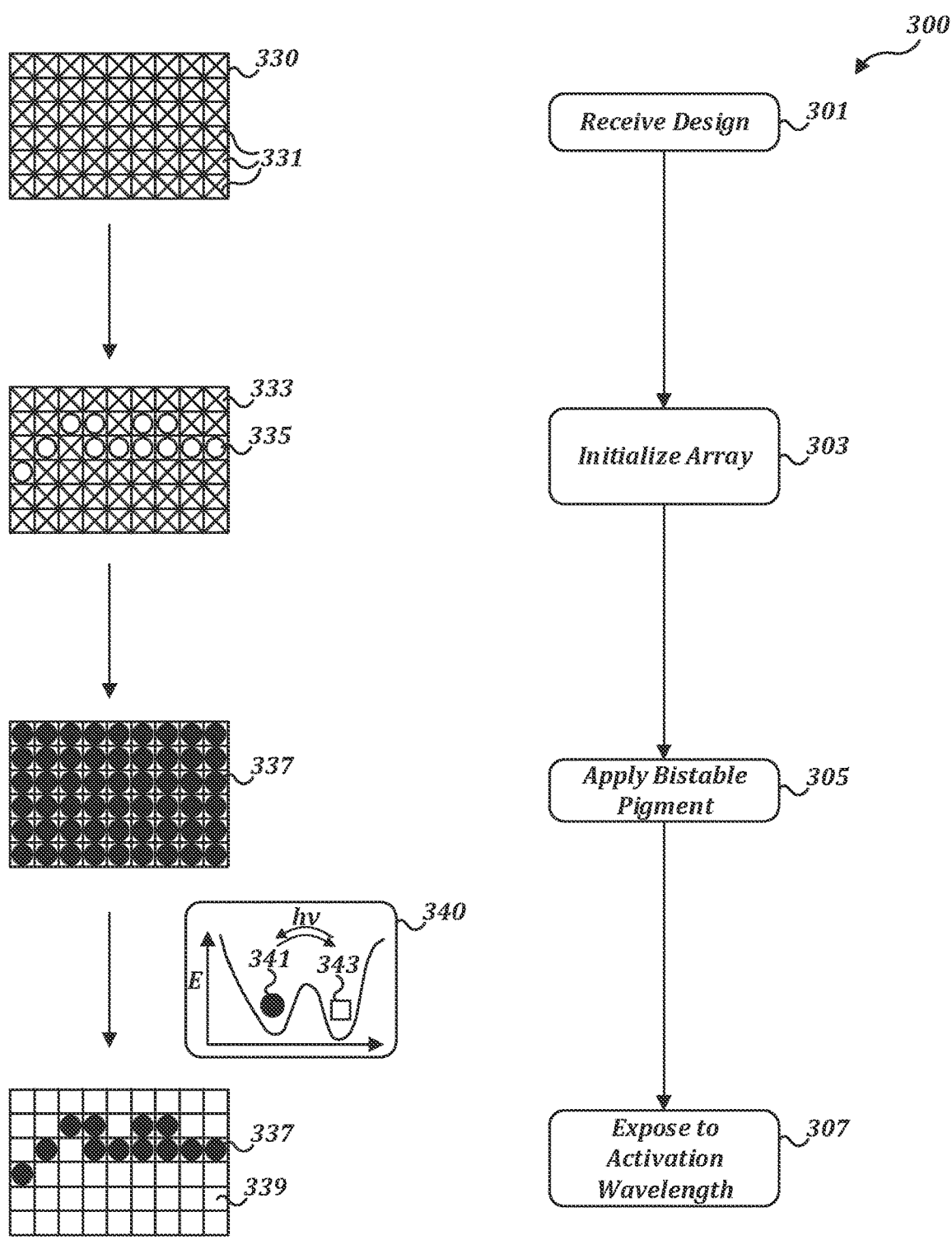
FIG. 3 is a schematic illustration of an example technique for preparing a cosmetic design using an applicator array device and bi-stable materials, in accordance with various embodiments.

As described in more detail in reference to FIG. 3, the pigment applicator 120 or the applicator array device 110 may include one or more sources of electromagnetic radiation, also referred to as an EM source(s), that is/are calibrated to switch a bistable formulation between a solid or viscous form and a liquid or fluid form. The pigment applicator 120 may incorporate the EM source(s) as part of the pigment applicator head, such that the bistable formulation may be applied generally onto the applicator array 111 as a liquid or fluid, and may be switched to a solid through exposure to the EM source(s) at the positions on the applicator array 111 corresponding to "true" values in the cosmetic design.

The client computing device(s) 130 may be or include a purpose-built mobile computing device including the pigment applicator 120 and/or the camera 140, one or more EM sources, and one or more user interface elements 131 to prompt the subject with visual and/or auditory prompts. For example, the interface elements 131 may be or include a display 133 to generate a visual representation of the cosmetic design. The interface elements 131 may also include user input components including, but not limited to, touch screen, keyboard, trackpad, or mouse. In this example, the components of the client computing device 130 may be integrated into a housing resembling a consumer cosmetic product such as, for example, an electric shaver dock. In this example, the housing may conceal power sources, heat management systems, and other components.

While the pigment applicator 120, client computing device 130, and camera 140 are illustrated in a particular configuration, additional and/or alternative form factors are contemplated. For example, the system 100 may include a smartphone or tablet computer in communication with the client computing device 130, such that one or more computer-executable operations are undertaken by the smartphone or tablet computer rather than by the pigment applicator 120 or the applicator array device 110. In this way, the pigment applicator 120 may have a form factor including, but not limited to, a cosmetics compact or an electronic peripheral configured to electronically couple with a smartphone or tablet computer that includes the camera 140.

In some embodiments, the camera 140 may be or include multiple sensors and/or sources including, but not limited to a visible light image sensor 141, a depth sensor 143 and/or a source of invisible EM radiation 145, including but not limited to infrared or near-infrared radiation. As with the applicator array device 110, the pigment applicator 120, and the client computing device(s) 130, the camera 140 may include communication circuitry 147 to enable wireless communication and/or pairing with the other constituent components of the example system 100. While the camera 140 is illustrated as a separate component of the example system 100, the camera 140 may also be integrated into one of the other constituent components of the example system 100. For example, the client computing device 130 may incorporate the camera 140. Similarly, the applicator array device 110 and/or the pigment applicator may incorporate the camera 140.

The depth sensor 143 may capture one or more images of a biological subject 180, including, but not limited to, images of a target body surface 181 of the biological subject 180. In the illustration provided in FIG. 1, the biological subject 180 is a human user of the example system 100 and the target body surface 181 is the face of the human user in the region around the eye and eyebrow. The depth sensor 143 may generate a surface mapping 183 of the target body surface 181. Contours and depth information for the target body surface 181 may vary over time or between users, and the camera may generate the surface mapping 183 as part of operations for modifying and/or generating a cosmetic design by the client computing device(s) 130. The depth sensor 185 may be an image sensor and may capture images within a field of view 185 including the target body surface 181. The depth sensor 143 may be or include, but is not limited to, a laser-based sensor (e.g., LiDAR), a time-of-flight camera, a vSLAM sensor assembly, or an ultrasound-based sensor assembly, such that the camera 140 may generate the surface mapping 183. For example, where the depth sensor is an infrared depth sensing camera, the source of invisible EM radiation 145 may be or include an infrared source that exposes the biological subject 180 including the target body surface 181 to invisible infrared radiation. In another example, where the depth sensor is a LiDAR system or a time-of-flight camera, the source of invisible EM radiation 145 may be or include an infrared diode laser. In this way, the EM radiation generated by the source of invisible EM radiation 145 may be scanned or otherwise directed toward the target body surface 181 over an angular spread 187, such that only the target body surface 181 is exposed. In some embodiments, detection of the target body surface 181 is facilitated and/or enabled by feature and/or edge detection applied to visible spectrum (e.g., RGB) images captured by the visible light sensor 141 (e.g., by vSLAM algorithms).

The surface mapping 183 may provide contour information and/or position information for features in the target body surface 181, for example, precise information about the relative position of the eyebrow ridge and the bridge of the nose, where the eyebrow begins and ends relative to the eye, etc. In this way, the surface mapping 183 may be used to generate the cosmetic design by determining a subset of applicator elements of the plurality of applicator elements to switch from the neutral or recessed position to the raised position. Similarly, where the cosmetic design may be received from the server 160, for example, as part of an online platform and/or database of cosmetic designs, the surface mapping 183 may be used to modify the cosmetic design by determining a subset of applicator elements of the plurality of applicator elements to switch from the raised position to the neutral or recessed position.

Figure 2:
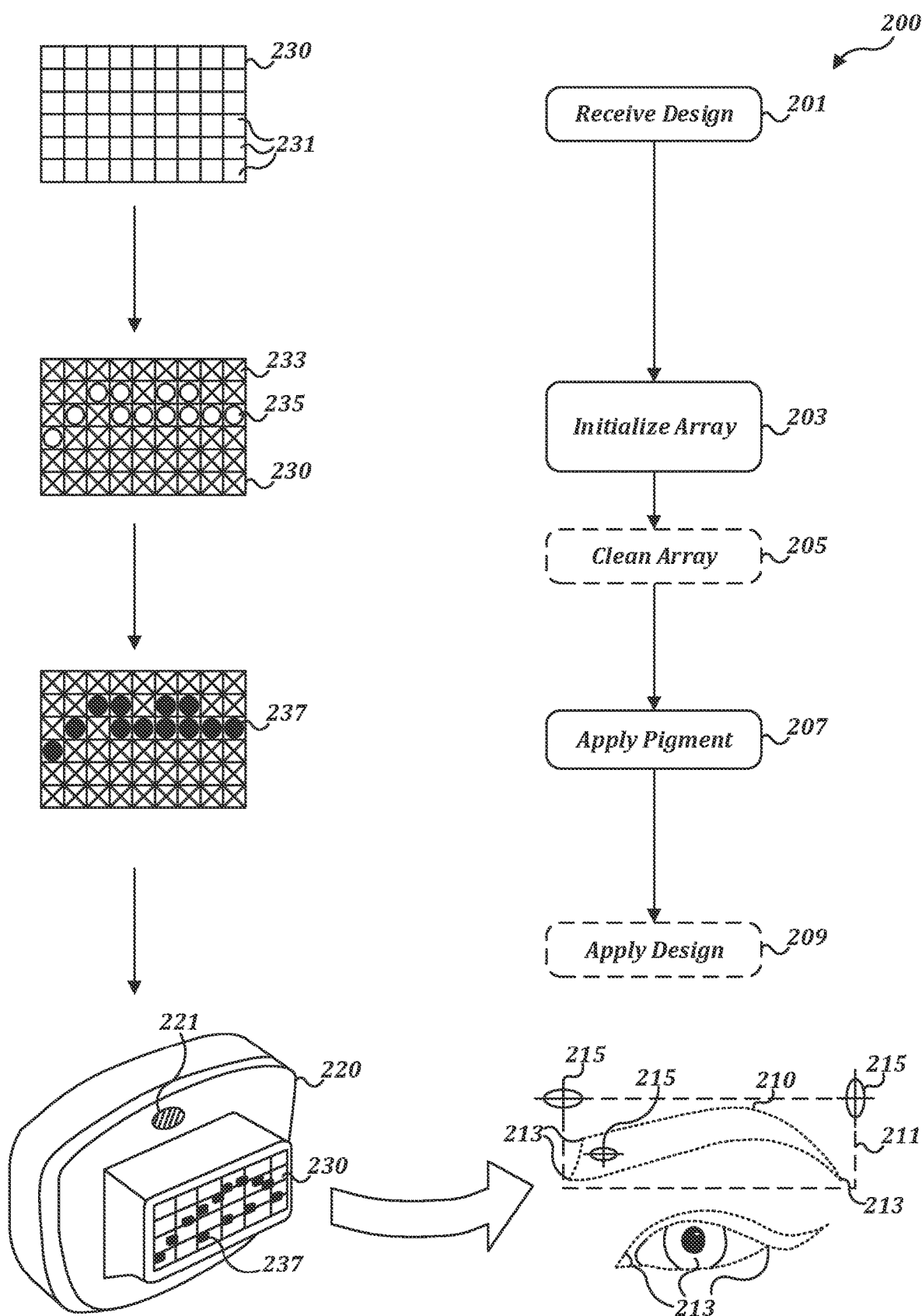
FIG. 2 is a schematic illustration of an example technique for preparing a cosmetic design using an applicator array device, in accordance with various embodiments.

FIG. 2 is a schematic illustration of an example technique 200 for preparing a cosmetic design using an applicator array device, in accordance with various embodiments. The example technique 200 may be implemented as a number of operations executed or otherwise performed by the example system 100 of FIG. 1. In this way, the operations may be or include operations performed by one or more processors of a computer system (e.g., applicator array device 110 of FIG. 1) in response to execution of computer-readable instructions stored on non-transitory memory of the computer system. While the operations are illustrated in a particular order, the example technique 200 may include more or fewer operations, and the order of operations may vary. In some embodiments, one or more operations are performed by multiple components of a system, as described in more detail in reference to FIG. 1. For example, some operations may be performed by different components interchangeably or may be performed by coordinated operation of two or more components.

At operation 201 the example technique 200 includes receiving a cosmetic design 210. In some embodiments, the cosmetic design 210 is a design guide including multiple points of pigment to be transferred onto a surface 211 (e.g., target body surface 181 of FIG. 1) of a biological subject (e.g., biological subject 180 of FIG. 1), such as a human. In some embodiments, the cosmetic design 210 is a complete cosmetic design that may include multiple colors and/or shades corresponding to different regions of the surface.

In some embodiments, the cosmetic design 210 is received by an applicator array device 220 (e.g., applicator array device 110 of FIG. 1) as a numerical representation of the design, including a dataset of true values and false values corresponding to a number of applicator elements 231 that together define an applicator array 230 of the applicator array device 220. The applicator array 230 may include the applicator elements 231 arranged in one or more configurations. As illustrated, the applicator array 230 includes applicator elements 231 arranged in a rectangular matrix. In some embodiments, the applicator elements 231 are arranged in configurations including, but not limited to ellipsoidal or circular arrays, triangular arrays, square arrays, pentagonal arrays, hexagonal arrays, heptagonal arrays, octagonal arrays, or higher order polygonal arrays. The configurations are not limited to regular polygons and include oblong arrays and irregular polygons. For example, the applicator array 230 may be configured as a trapezoidal array of applicator elements 231.

Operations for receiving the cosmetic design may include one or more data transfer techniques including, but not limited to, wireless communication or wired communication. For example, the applicator array device 220 may communicate wirelessly with a client computing device (e.g., client computing device 130 of FIG. 1) to receive the cosmetic design 210 as a wireless transmission. In another example, the applicator array device 220 may communicate through a temporary physical coupling with a pigment applicator (e.g., pigment applicator 120 of FIG. 1) to receive the cosmetic design 210 via electronic transfer (e.g., through a Universal Serial Bus-type connection).

As described in more detail in reference to FIG. 1, the cosmetic design 210 may be or include information describing a neutral position 233 of a first subset of the applicator elements 231 and a raised position 235 of a second subset of the applicator elements 231. The terms "neutral" and "raised" are used here to describe a "false" and "true" value in the cosmetic design 210, respectively, rather than an absolute position. For example, the "raised" position may describe a default position of an applicator element 231, while the "neutral" position may describe a recessed position beneath an outer surface of the applicator array. In this way, the default position of the applicator elements 231 may be the neutral position 233 or the raised position 235.

Illustrative examples of the cosmetic design 210 are described in reference to a binary dataset. In some embodiments, the cosmetic design 210 includes additional intermediate states between true and false states that correspond to intermediate positions of the applicator elements 231 between the neutral position 233 and the raised position 235. In this way, the cosmetic design 210 may also include information for shading, shaping, color, as well as other aesthetic features. In an illustrative example the cosmetic design 210 may include one or more portions in a lighter shade or with smaller points, to indicate a lighter application of cosmetic formulation or a different color.

Subsequent receiving the cosmetic design 210, the example technique 200 may include initializing the applicator array 230 at operation 203. Prior to operation 203, the applicator elements 231 may be in various positions, for example, resulting from a previous iteration of the example technique 200. In this way, initializing the applicator array 230 refers to one or more processes to place the applicator elements 231 of the applicator array 230 into the positions corresponding to the cosmetic design 210. For example, initializing the applicator array 230 may describe switching a subset of the applicator elements 231 from the raised position 235 to the neutral position 233. Similarly, initializing the applicator array 230 may describe switching a subset of the applicator elements 231 from the neutral position 233 to the raised position 235. In some embodiments, initializing the applicator array 230 includes returning the applicator elements 231 to a default position or to a cleaning position prior to switching the applicator elements 231 to the neutral or raised positions.

In some embodiments, the example technique 200 may optionally include cleaning the applicator array 230 at operation 205. Cleaning the applicator array 230 may include, but is not limited to, applying a solvent or other removal formulation to the applicator array 230, at least partially submerging the applicator array 230 in a bath of the solvent or other removal formulation, exposing the applicator array 230 to ultrasonic energy (e.g., pulsed ultrasound) through a liquid that may include the solvent or other removal formulation, and/or mechanical removal such as wiping, scrubbing or pressing. In some embodiments, the pigment applicator incorporates circuitry and components to facilitate cleaning operations. For example, the pigment applicator may include a reservoir of cleaning fluid and an ultrasonic resonator (e.g., a sonic bath) to which the applicator array device 220 can reversibly couple, at least partially submerging the applicator array 230. In this way, residual pigment may be removed from the applicator array 230 and its constituent applicator elements 231. While cleaning is described as an optional operation of the example technique 200, it is understood that cleaning may also be included as part of initializing the applicator array 230. For example, where some of the operations of the example technique 200 are performed while the applicator array device 220 is reversibly coupled with the pigment applicator, cleaning and initializing may be performed concurrently (e.g., at least partially overlapping in time), under the control of one or more processors of the pigment applicator and/or the applicator array device 220.

Subsequent initializing the applicator array 230, the example technique 200 includes applying a pigment 237 to a portion of the applicator array 230 at operation 207. Applying the pigment 237 may include selectively applying pigment(s) 237 to the applicator elements 231 in the raised position 235, in accordance with the cosmetic design 210. In this context, "selectively" may refer to passively applying pigment to the applicator elements 231 that contact a pigment source (e.g., a pigment pad), but may also refer to an active process where an addressable applicator head may be automatically directed to apply the pigment 237 to the applicator elements 231 in the raised position 235. As described in more detail in reference to FIG. 1, the pigment applicator may facilitate the active process by incorporating the addressable applicator head, which may be controlled by circuitry of the pigment applicator and/or the applicator array device 220.

In some embodiments, the example technique 200 may optionally include applying the cosmetic design 210 to the surface 211 at operation 209. Applying the cosmetic design 210 may include, but is not limited to, manually guiding the applicator array device 220, carrying the pigment 237 applied to the applicator array 230 in accordance with the cosmetic design 210, to a precise position on the surface 211. Precise application may be facilitated by making reference to features 213 of the surface 211 or near the surface 211 that guide or otherwise align the applicator array 230 relative to the features 213. For example, a mapping of the surface 211 may be generated and may detect edges, depth information, and/or contours of the surface 211. The mapping may be referenced to register where on the surface 211 to apply the pigment.

In some embodiments, one or more registration marks 215 may be placed on the surface 211, for example, by manually indicating one or more of the features 213. The registration mark(s) 215 may be or include a temporary pigment, including but not limited to an acid-base unstable pigment or an ultraviolet- and/or heat-sensitive pigment, selected to leave negligible visible indication after a characteristic period of time for indoor and/or outdoor use. In some embodiments, the registration mark(s) 215 may be applied to the surface 211 within the area described by the cosmetic design 210. In this way, the registration mark(s) 215 may be occluded by the eventual deposition of pigment in accordance with the cosmetic design 215, after the applicator array device 220 has been applied to the surface 211.

In some embodiments, the applicator array device 220 includes one or more emitters 221 to project the registration mark(s) 215 onto the surface 211. An emitter 221 may be or include, but is not limited to, a projector, a coherent radiation source (e.g., a laser), or a collimated source (e.g., a light-emitting diode configured with beam-shaping optics). The emitter(s) 221 may be calibrated to emit one or more patterns onto the surface 211 to indicate the position of the applicator array 230 relative to the surface 211. In an illustrative example, the emitter 221 may emit a line onto the surface 211 indicative of the application position of the applicator array 230. In this way, the applicator array 230 may be guided to the correct position on the surface by aligning the projection generated by the emitter 221 with the registration mark 215. While an emitter 221 is illustrated external to the applicator array 230, the emitter(s) 221 may be disposed between the applicator elements 231 of the applicator array 230. For example, an emitter 221 may be a calibrated to emit one or more patterns or beams onto the surface 211 from a point- and/or line-source located on the operative surface of the applicator array 230 (e.g., a beamforming optic being optically coupled to one or more light-emitting diodes positioned within the body of the applicator array device 220). In this way, the emitter 221 may project a pattern and/or beam onto the surface 211 without occlusion by the applicator array 230 when the applicator array device 220 approaches the surface 211.

In some embodiments, applying the design includes multiple iterations of the operations of example technique 200. For example, a complete cosmetic design may include application of multiple colors or layers. As such, the operations may be repeated for each color. In some embodiments, the cosmetic design 210 differs between iterations, in accordance with different design features.

While the description of the example technique 200 has focused on cosmetic guides for eyebrow/eye regions, the operations may similarly be applied to other surfaces 211. For example, the cosmetic design 210 may describe application of cosmetic formulations to additional/alternative surfaces 211 including, but not limited to, lips, nose, cheeks, forehead, or hands. Similarly, cosmetic designs 210 may be generated to modify the appearance of cosmetic features, including but not limited to eyebrows, eyes, lips, cheekbones, jawline, or hands. Cosmetic designs 210 may also be generated to conceal aspects of the surface 211 including, but not limited to, blemishes, scars, or burns. In an illustrative example, the example technique 200 may be applied to conceal an acne blemish by application of a first cosmetic design 210 in a first pigment to indicate where on the surface 211 to apply a foundation, and a second cosmetic design in a second pigment to indicate where to apply a concealer. In another illustrative example, a cosmetic design 210 may include a template for emphasizing the appearance of cheekbones.

FIG. 3 is a schematic illustration of an example technique 300 for preparing a cosmetic design using an applicator array device and bi-stable materials, in accordance with various embodiments. The example technique 300 may be implemented as a number of operations executed or otherwise performed by the example system 100 of FIG. 1. In this way, the operations may be or include operations performed by one or more processors of a computer system (e.g., applicator array device 110 of FIG. 1) in response to execution of computer-readable instructions stored on non-transitory memory of the computer system. While the operations are illustrated in a particular order, the example technique 300 may include more or fewer operations, and the order of operations may vary. One or more operations of the example technique 300 may be included as constituent operations of the example technique 200 described in reference to FIG. 2 (e.g., operation 207 of FIG. 2).

At operation 301, an applicator array device, which may be an example of applicator array device 110 of FIG. 1 and/or applicator array device 220 of FIG. 2, receives a cosmetic design (e.g., cosmetic design 210 of FIG. 2). The applicator array device may include an applicator array 330 including applicator array elements 331 that together define the applicator array 330. While the applicator array 330 is illustrated as a rectangular matrix, the applicator array 330 may assume other shapes, as described in more detail in reference to FIG. 2.

Subsequent receiving the cosmetic design, the example technique 300 includes initializing the array 330, at operation 303. The applicator elements 331 may be in any position relative to the surface of the applicator array prior to initialization. For example, a subset of the applicator elements 331 may be in a neutral or recessed position 333 and a different subset may be in a raised position 335. Initializing the applicator array 330 may include modifying the position of at least some of the applicator elements 331 to switch between the neutral or recessed position 333 and the raised position 335, in accordance with the cosmetic design received at operation 301.

Subsequent initializing the applicator array 330, the example technique 300 includes applying a bistable pigment 337 at operation 305. In this context, the term "bistable" refers to a polymeric material that absorbs electromagnetic radiation at a characteristic energy (hv) to form crosslinking bonds that may be reversed upon exposure to different EM radiation in the UV/visible spectral ranges. Formation of the temporary crosslinking bonds may shift the bistable pigment 337 from a fluid 341 to a solid 343, and removal of crosslinking bonds may shift the bistable pigment 337 from a solid 343 to a liquid 341. In some embodiments, the fluid 341 may be characterized by a viscosity that permits the bistable pigment 337 to transfer to the surface (e.g., surface 211 of FIG. 2). In contrast, the solid 343 may be or include a solid and or a viscous fluid, either of which may be resistant to transfer onto the surface. In this way, the resulting applicator array 330 may be patterned by localized exposure to the activation wavelength to switch the bistable pigment 337 from one phase to another, leaving a subset of the applicator elements 331 with bistable pigment 337 as liquid 341. In some embodiments, the cosmetic design is formed by patterning the bistable pigment 337 without initializing the applicator array 330.

Without being bound to a physical mechanism of action, the bistable pigment 337 may be or include a polymer matrix incorporating a thioester functional group. The thioester functional group may participate in an exchange reaction with free thiol as promoted by a base catalyst. The exchange reaction may be modulated by mild basic or mild acidic catalysts, which are released by exposure of the polymer matrix to EM radiation at the characteristic activation wavelength(s) at operation 307. Examples of the characteristic activation wavelength may include, but are not limited to, wavelengths in a range from 300 nm to 500 nm. For example, the characteristic activation wavelength may be 320 nm, 330 nm, 340 nm, 350 nm, 360 nm, 370 nm, 380 nm, 390 nm, 400 nm, 410 nm, 420 nm, 430 nm, 440 nm, 450 nm, 460 nm, 470 nm, 480 nm, 490 nm, 500 nm, 510 nm, 520 nm, 530 nm, 540 nm, 550 nm, or interpolations thereof (e.g., 455 nm). Furthermore, the photo-mediated release of acid/base catalysts may exhibit spatial and temporal localization of phase-switching of the bistable pigment 337. In this way, phase-switching may be localized to the applicator elements 331 in the raised position 335 from solid 343 to liquid 341, or may be localized to the applicator elements 331 in the neutral or recessed position 333 from liquid 341 to solid 343.

Figure 4:
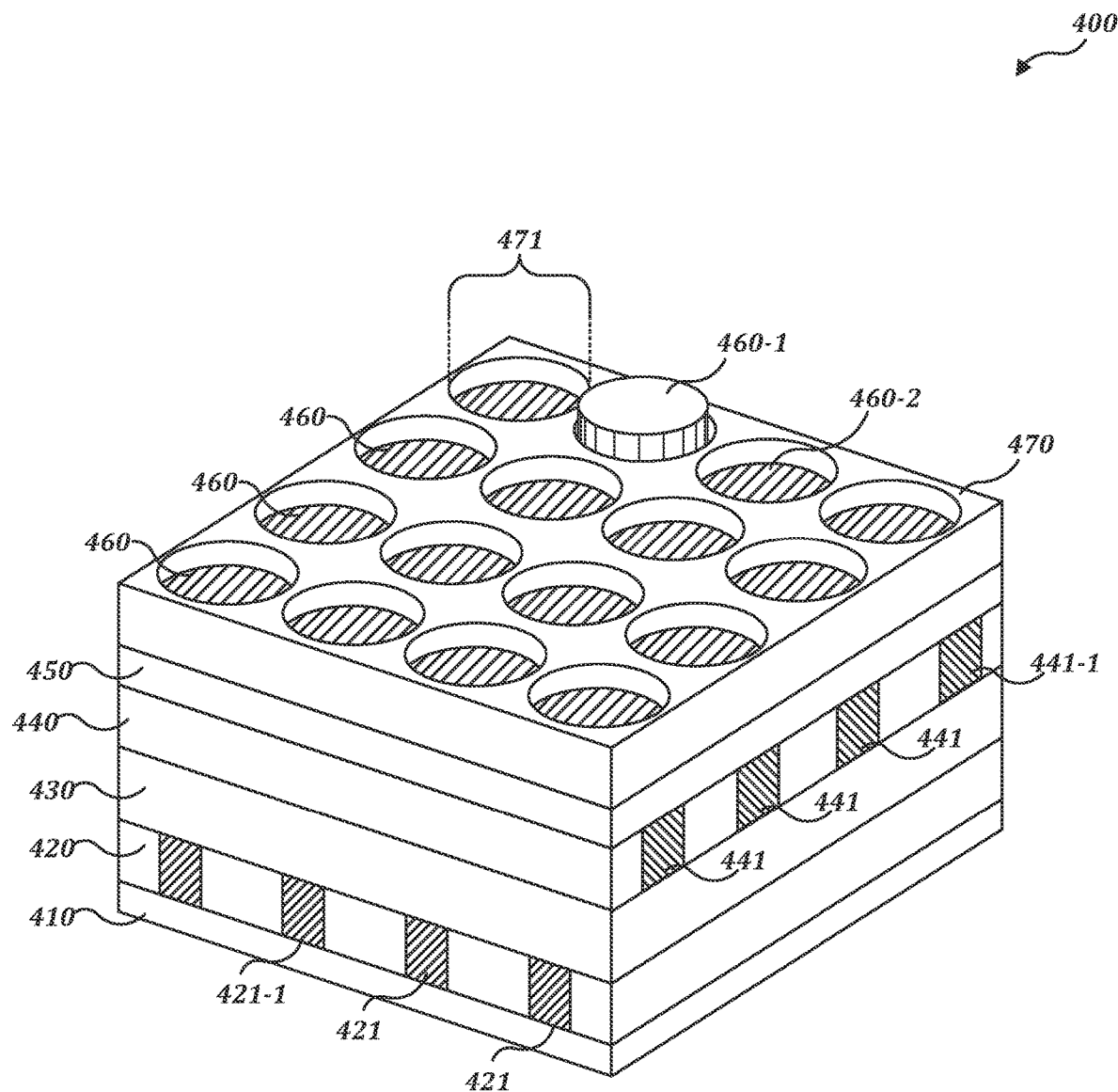
FIG. 4 is a schematic illustration of an example applicator array, in accordance with various embodiments.

FIG. 4 is a schematic illustration of an example applicator array 400, in accordance with various embodiments. The example applicator array 400 may be an example of applicator array 111 of FIG. 1, applicator array 230 of FIG. 2, and/or applicator array 330 of FIG. 3. The example applicator array 400 may be integrated into an applicator array device, such as applicator array device 110 of FIG. 1, and may be actuated to apply a cosmetic design to a target body surface, as described in more detail in reference to FIGS. 1-3.

The example applicator array 400 is illustrated as a multilayer electronic device incorporating a substrate 410, a first electrode layer 420, an electroactive polymer layer 430, a second electrode layer 440, an applicator surface layer 450, and a screen 470. In some embodiments, the example applicator array 400 includes additional and/or alternative elements in various configurations. The substrate 410, the first electrode layer 420, the electroactive polymer layer, the second electrode layer 440, and the applicator surface layer 450 may be discretized or differentiated into individual applicator elements 460 that together define the example applicator array 400. While the example applicator array 400 is illustrated as a square matrix of applicator elements 460, other polygonal array configurations are contemplated including, but not limited to, hexagonal arrays, rectangular arrays, circular arrays, triangular arrays, or the like. Similarly, while the applicator elements 460 are illustrated as circular, other shapes are contemplated including, but not limited to, triangular, square, rectangular, pentagonal, hexagonal, or octagonal.

In an illustrative example, a first applicator element 460-1 of the applicator elements 460 may be individually addressed by completing a circuit between the first electrode layer 420 and the second electrode layer 440, via the electroactive polymer layer 430, at the position of the first applicator element 460-1. In this way, the first applicator element 460-1 may switch between a neutral or recessed position and a raised position, as shown, while a neighboring second applicator element 460-2 may retain a neutral or recessed position. In some embodiments, the first applicator element 460-1 may switch from the neutral or recessed position to the raised position upon opening the circuit between the first electrode layer 420 and the second electrode layer 440, via the electroactive polymer layer 430, at the position of the first applicator element 460-1, based at least in part on the configuration of the electroactive polymer layer relative to the applicator surface layer 450.

In some embodiments, the circuits described may be formed by paired conductive traces, between one of multiple first electrode traces 421 and one of multiple second electrode traces 441. For example, a circuit may be closed or opened, depending on the internal configuration of the first applicator element 460-1, between a first trace 421-1 of the first electrode traces 421 and a first trace 441-1 of the second electrode traces 441. In this way, the applicator elements 460 may be individually addressable by controllably closing circuits between the electrode traces of the example applicator array 400.

In some embodiments, each applicator element 460 is individually coupled with a control switch that is operably coupled with a controller to open and close the circuit for the respective applicator element 460. In this way, the applicator elements 460 may be raised or lowered in accordance with a cosmetic design, as described in more detail in reference to FIG. 2, (e.g., operation 203 of FIG. 2).

The applicator surface layer 450 may be or include a flexible polymeric or rubber material. The applicator surface layer 450 may define an applicator tip for each of the applicator elements 460. While the applicator elements are illustrated as substantially flat, the applicator surface layer 450 may be formed with topography on each of the applicator elements. For example, the applicator tips may be ridged, concave, convex, pyramidal, hemi-spherical, or the like, such that the volume of pigment and application of pigment to the surface may be metered and/or controlled by modulating the pressure applied between the applicator elements 460 and the target surface.

The screen 470 may be or include a perforated screen including multiple windows 471 corresponding to the applicator elements 460. The screen 470 may be a discrete element of the example applicator array 400, or it may be formed from the applicator surface 450, for example, by molding a polymeric material to have a defined topography. For example, through injection molding of a polymer or rubber material, fold points may be introduced into the applicator surface 450 corresponding to the peripheries of the windows 471, such that the applicator elements 460 may be individually actuated between the raised position and a recessed position. Advantageously forming the applicator surface 450 and the screen 470 from a continuous material may reduce the quantity of residual pigment that is retained between cleanings of the example applicator array 400.

The substrate 410 may be or include a flexible material, including, but not limited to a polymer, elastomer, rubber, or other insulating and flexible material. Advantageously, a flexible material may improve the ability of the example applicator array 400 to conform to the target body surface. In some cases, the first electrode traces 421 and/or the second electrode traces 441 may be or include flexible conductors, including but not limited to flexible/stretchable carbon conductors, silver conductors, or copper conductors. In an illustrative example, the carbon conductors may be or include conductive carbon materials (e.g., carbon fibers, nanotubes, graphene, or the like) suspended in a monomer or polymer matrix. Similarly, the silver or copper conductors may be or include conductive materials (e.g., nanorods, nanoparticles, or the like) suspended in a matrix. The conductors may be screen-printed, evaporation-deposited, or otherwise patterned onto the substrate 410 to form the electrode traces 421 and 441. Flexibility of the substrate 410 may also be implemented through articulation of multiple rigid segments in the substrate 410, joined by flexible mechanical couplings.

Figure 5:
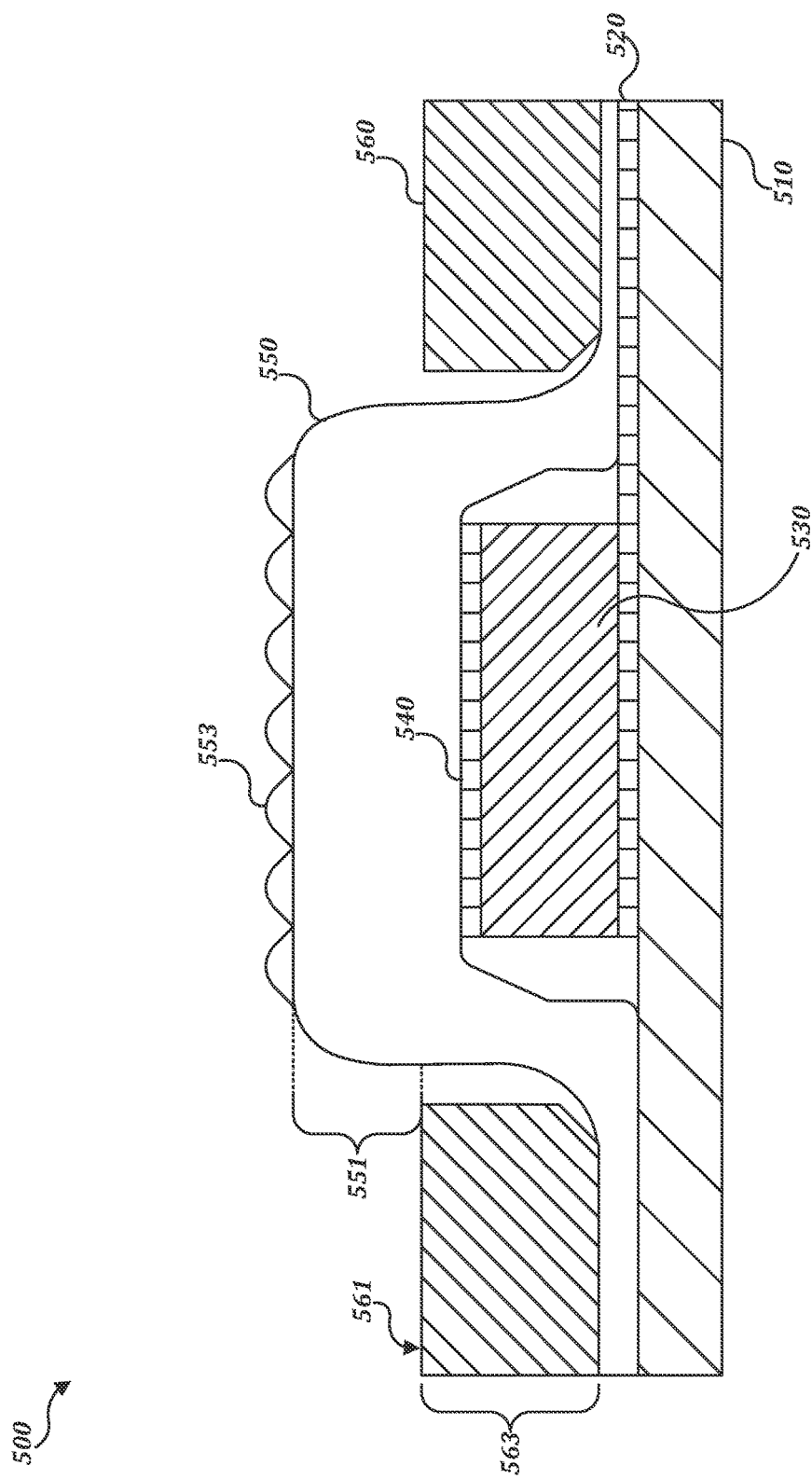
FIG. 5 is a schematic illustration of an example applicator element, in accordance with various embodiments.

FIG. 5 is a schematic illustration of an example applicator element 500, in accordance with various embodiments. The example applicator element 500 may be an example of the applicator elements 231 of FIG. 2, applicator elements 331 of FIG. 3, and/or applicator elements 460 of FIG. 4. The example applicator element 500 includes a substrate 510, a first electrode 520, an electroactive polymer layer 530, a second electrode 540, an applicator surface 550, and a screen 560. The example applicator element 500, with multiple additional applicator elements, may together define an applicator array (e.g., applicator array 111 of FIG. 1, applicator array 230 of FIG. 2, applicator array 330 of FIG. 3, and/or example applicator array 400 of FIG. 4).

The substrate 510 may be or include a rigid material or a flexible material, overlying which the components of the example applicator element 500 may be disposed. For example, the first electrode 520 may be disposed on at least a portion of the substrate. The electroactive polymer layer 530 may be disposed overlying at least a portion of the first electrode 520. The second electrode 540 may be disposed overlying at least a portion of the electroactive polymer layer 530. The applicator surface 550 may be disposed overlying the substrate 510, the first electrode 520, the electroactive polymer layer 530, and/or the second electrode 540. In some embodiments, the first electrode 520 and the second electrode 540 are physically and/or electrically isolated, for example by an insulating material interposed between the first electrode 520 and the second electrode.

The electroactive polymer layer 530 may be electrically coupled with the first electrode 520 and the second electrode 540 to serve as a conductive bridge therebetween. As such, when the circuit is closed (e.g., by closing a switch corresponding to the example applicator element 500) the electroactive polymer layer 530 may switch between a first configuration and between a second configuration in response to the application of a voltage across the electroactive polymer layer 530. The electronic operation of the electroactive polymer layer 530 is described in more detail in reference to FIGS. 7A-7C.

The electroactive polymer layer 530, when actuated either by opening or closing the circuit, may raise the applicator surface 550 into a raised position. The raised position may extend the applicator surface 550 a distance 551 above the neighboring applicator elements of the applicator array. In some embodiments, the distance 551 is defined relative to an outer surface 561 of the screen 560, where the applicator elements are recessed beneath the outer surface 561 when not in the raised position. The applicator surface 550 may include surface topography 553 corresponding to the position of the electroactive polymer layer 530. The topography 553, as well as the material from which the applicator surface 550 is formed, may improve the efficacy of transferring a cosmetic design onto a surface. While the topography 553 is illustrated as multiple ridges, other topography 553 configurations are contemplated including, but not limited to, concentric ridges, hemispherical, concave, convex, lens-shaped, or polyhedral surface topographies 553.

In some embodiments, the screen 560 has a thickness 563 whereby the applicator elements 550 are recessed below the outer surface 561 at a neutral position and are proud of the outer surface 561 when at a raised position (e.g., neutral position 233 of FIG. 2 and raised position 235 of FIG. 2). As described in more detail in reference to FIGS. 6-7C, the neutral position may correspond to an open circuit across the electroactive polymer layer 530 or to a closed circuit across the electroactive polymer layer 530. The resulting change in morphology of the electroactive polymer layer 530 may be attributable to the position of the electroactive polymer layer 530 relative to the substrate 510 or whether force is applied directly to the applicator surface 550 or through a lever. For the example applicator element 500, the electroactive polymer layer 530 may switch between the recessed position and the raised position upon opening the circuit between the first electrode 520 and the second electrode.

Figure 6:
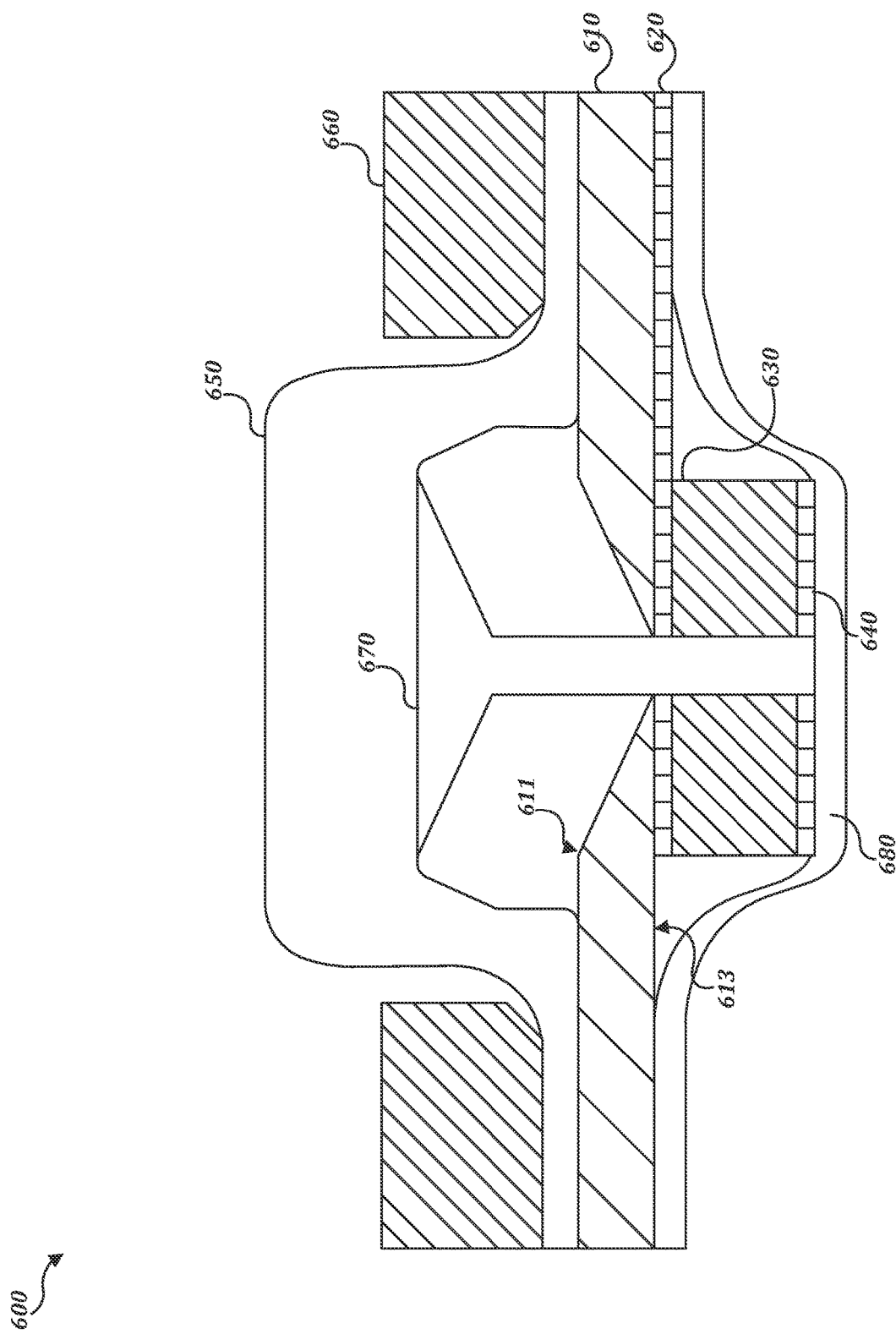
FIG. 6 is a schematic illustration of another example applicator element, in accordance with various embodiments.
Figure 7:
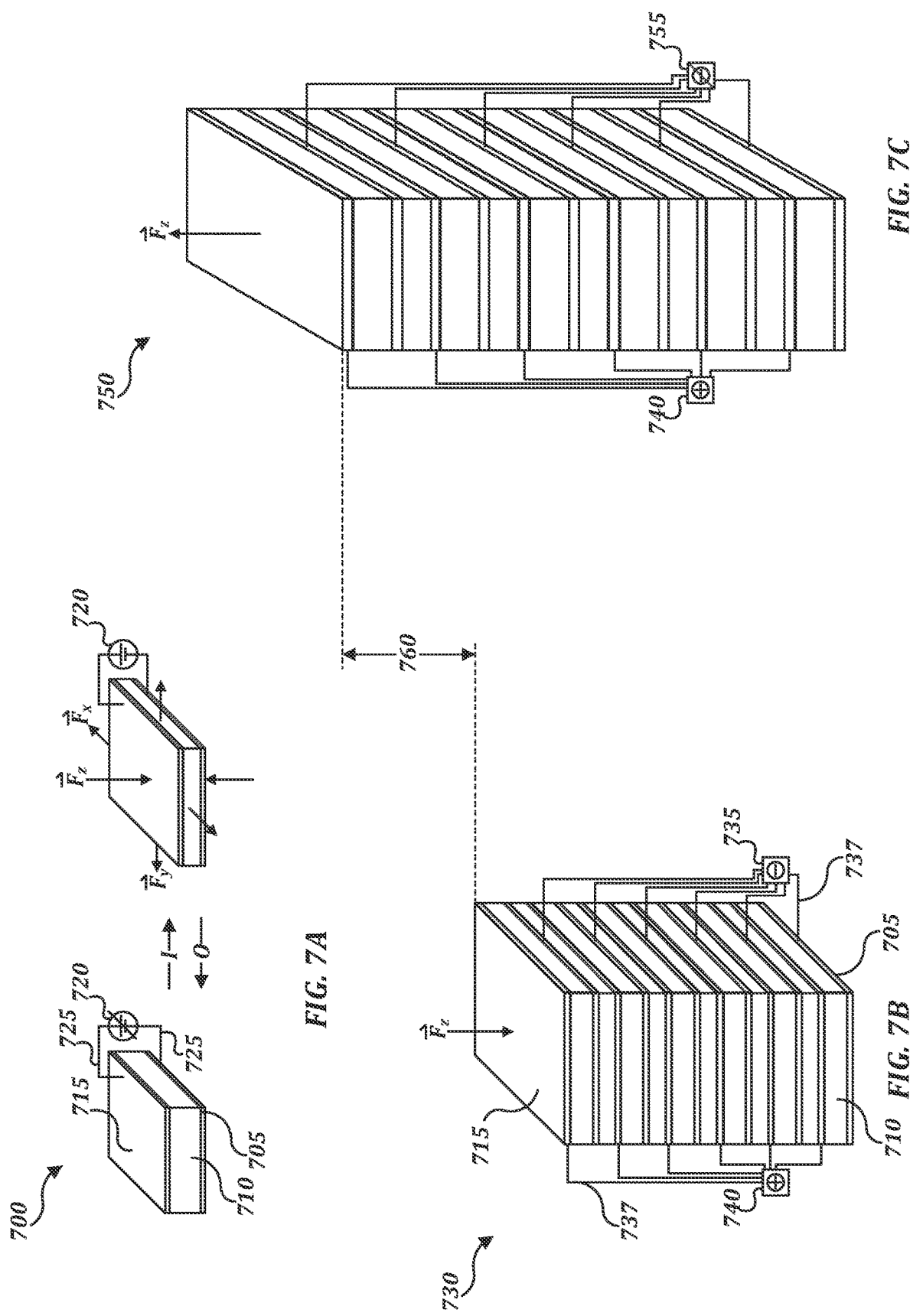
FIG. 7A is a schematic illustration of an example electroactive polymer cell, in accordance with various embodiments.
FIG. 7B is a schematic illustration of an example electroactive polymer cell stack under an applied voltage, in accordance with various embodiments.
FIG. 7C is a schematic illustration of an example electroactive polymer cell stack without application of an applied voltage, in accordance with various embodiments.

FIG. 6 is a schematic illustration of another example applicator element 600, in accordance with various embodiments. The example applicator element 600 may be an example of the applicator elements 231 of FIG. 2, applicator elements 331 of FIG. 3, and/or applicator elements 460 of FIG. 4. The example applicator element 600 includes a substrate 610, a first electrode 620, an electroactive polymer layer 630, a second electrode 640, an applicator surface 650, a screen 660, a piston 670, and a support layer 680. The example applicator element 600, with multiple additional applicator elements similarly configured, may together define an applicator array (e.g., applicator array 111 of FIG. 1, applicator array 230 of FIG. 2, applicator array 330 of FIG. 3, and/or example applicator array 400 of FIG. 4).

In contrast to the example applicator element 500 of FIG. 5, the example applicator element 600 includes a different arrangement of constituent elements, relative to the substrate 610 that are structured to switch the applicator surface between a recessed position and a raised position upon application of a voltage across the electroactive polymer layer 630, rather than upon removal of the voltage across the electroactive polymer layer 630. Advantageously, the configuration of the example applicator element 600 may consume relatively less power per application cycle, in that only those applicator elements of the applicator array that are to be raised proud of the screen 660 (e.g., those corresponding to the "true" values in the cosmetic design 210 of FIG. 2) may be electrified. Without being bound to a particular physical mechanism, the difference between the example applicator element 500 of FIG. 5 and the example applicator element 600 may be at least partially attributable to the tendency of electroactive polymer materials to contract when under an applied voltage.

In some embodiments, the example applicator element 600 includes the applicator surface 650 and the screen 660 disposed on a first side 611 of the substrate 610. On a second side 613 of the substrate 610, the example applicator element 600 may include the piston 670 extending through the substrate 610 and operably coupled to the support layer 680. To facilitate the operation of the example applicator element 600, the electroactive polymer layer 630 and the first electrode 620 and/or the second electrode 640 may be disposed on the second side 613 of the substrate 610, between the substrate 610 and the support layer 680.

The support layer 680 may be or include an elastic or tensile material, such as a rubber, polymer, or elastomer material, that is under tension, such that a force may be applied to the piston 670 in a direction normal to the surface of the substrate 610. The support layer 680 may be or include a rigid housing for the piston 670 and the electroactive polymer that may include a spring to bias the piston 670. In this way, modulation of the morphology of the electroactive polymer layer 630, through application of a voltage across the electroactive polymer layer 630, may inversely affect the position of the applicator surface 650. For example, where an open circuit across the electroactive polymer layer 630 may expand the volume (e.g., height and/or width) of the electroactive polymer layer 630, the force of the expansion may cause the piston 670 to retract relative to the first side 611 of the substrate 610.

FIG. 7A is a schematic illustration of an example electroactive polymer cell 700, in accordance with various embodiments. The example electroactive polymer cell 700 includes a first electrode 705, an electroactive polymer layer 710, a second electrode 715, and a voltage source 720. The example electroactive polymer cell 700 may an example of the electroactive polymer layer 430 of FIG. 4, electroactive polymer layer 530 of FIG. 5, and/or electroactive polymer layer 630 of FIG. 6. The voltage source 720 may be electrically coupled with the first electrode 705 and the second electrode 725 via conductive traces 725. The conductive traces 725 may be or include at least a portion being a flexible material, as described in reference to FIGS. 5-6.

The example electroactive polymer cell 700 may be described by two different morphologies corresponding to whether the voltage source 720 applies a voltage across the electroactive polymer layer 710. As illustrated in FIG. 7A, when the voltage source 720 is open or shorted, such that no voltage is applied across the electroactive polymer layer 710, the example electroactive polymer cell 700 may assume a first morphology. In response to closing the circuit, thereby applying the voltage across the electroactive polymer layer 710, the example electroactive polymer cell 700 may shift to a second morphology, as a result of forces ($F_x$, $F_y$, $F_z$) generated by changes in the polymer structure. While the forces are described in reference to cartesian axes, the example electroactive polymer cell 700 may be a cylindrical cell or may assume other shapes, such that alternative coordinate spaces may better describe the forces generated following application of the voltage to the example electroactive polymer cell 700.

In some embodiments, the electroactive polymer layer 710 may be or include, but is not limited to, materials such as conducting polymers, dielectric elastomers, ferroelectric polymers, ionic polymer metal composite (IPMC), or polyvinylidene difluoride (PVDF). Material selection may be informed by different electronic and structural properties. For example, conductive polymers and IPMC may respond to a relatively lower activation voltage, as compared to PVDF, dielectric elastomers, or ferroelectric polymers, while dielectric elastomer, ferroelectric, and/or PVDF may generate a relatively stronger actuation force at a relatively higher voltage.

The magnitude of the voltage may be influenced by the chemical structure and/or the physical dimensions of the electroactive polymer layer 710. In some cases, a higher voltage may provide a greater movement or greater force upon application, but may also introduce electromagnetic interference effects in the applicator array device, such as corona discharge formation. Such concerns may increase the complexity of the electronic components of the applicator array device, and may reduce performance. In this way, the example electroactive polymer cell 700 may be configured to apply the voltage to induce an effective change in morphology, without also introducing negative effects. In some embodiments, the voltage is about 10 kV or less, about 9 kV or less, about 8 kV or less, about 7 kV or less, about 6 kV or less, about 5 kV or less, about 4 kV or less, about 3 kV or less, about 2 kV or less, about 1 kV or less, about 0.9 kV or less, about 0.8 kV or less, about 0.7 kV or less, about 0.6 kV or less, about 0.5 kV or less, about 0.4 kV or less, about 0.3 kV or less, about 0.2 kV or less, about 0.1 kV or less, or less, including fractions and interpolations thereof. For example, the voltage may be about 5.9 kV or less, about 5.8 kV or less, about 5.7 kV or less, about 5.6 kV or less, about 5.5 kV or less, about 5.4 kV or less, about 5.3 kV or less, about 5.2 kV or less, or about 5.1 kV or less. In this context, "about" is used to refer to a value within 10% of the stated value (e.g., from 90% to 110% of the stated value).

FIG. 7B is a schematic illustration of an example electroactive polymer cell stack 730 under an applied voltage, in accordance with various embodiments. In some embodiments, the applicator elements (e.g., applicator elements 231 of FIG. 2) that together define the applicator array (e.g., applicator array 230 of FIG. 1) each include multiple electroactive polymer layers 710 (e.g., electroactive polymer layer 430 of FIG. 4, electroactive polymer layer 530 of FIG. 5). The multiple electroactive polymer layers 710 may be interleaved with multiple first electrodes 705 and multiple second electrodes 715, and together may define the example electroactive polymer cell stack 730. The multiple first electrodes 705 may be electrically coupled with a negative terminal 735. The multiple second electrodes 715 may be electrically coupled with a positive terminal 740. In this context, the terms "positive" and "negative" are used to indicate relative voltage. For example, the positive terminal 740 may be a ground, such that the voltage at the positive terminal 470 may be zero. Similarly, the negative terminal 735 may be biased at a positive absolute voltage, relative to ground, that is smaller than the positive voltage at the positive terminal 740, such that the electrons may flow from the negative terminal 735 to the positive terminal 740. Similarly, both the positive terminal 740 and the negative terminal 735 may be biased negatively relative to true ground.

The positive terminal 740 and the negative terminal 735 may each be electronically coupled with the multiple electroactive polymer layers 710 using conductive traces 737. In this way, the terminals may be or include current-carrying components of electronic control circuitry used to drive the applicator array. For example, the positive terminal 740 and the negative terminal 735 may each be connected to appropriate components of a direct current power supply, including circuitry and components to apply the voltage across the multiple electroactive polymer layers 710, as described in more detail in reference to FIG. 7A.

FIG. 7C is a schematic illustration of an example electroactive polymer cell stack 750 without application of an applied voltage, in accordance with various embodiments. When the circuit across the example electroactive polymer cell stack 730 is opened, one or more of the voltage terminals may be electrically decoupled from the multiple electroactive polymer layers 710. As illustrated, the negative terminal 735 of FIG. 7B may be decoupled to form an open terminal 755, thereby breaking the circuit and removing the voltage from the example electroactive polymer cell stack 750.

In this way, example electroactive polymer cell stack 730 of FIG. 7B may change shape to provide the example electroactive polymer cell stack 750. In some embodiments, therefore, a displacement 760 may describe the sum of the changes in morphology for each of the constituent electroactive polymer layers 710 included in the electroactive polymer cell stack 750, which may increase the total travel of the applicator elements making up the applicator array, and may improve the contrast and precision of the applicator array device. In terms of the cosmetic design (e.g., cosmetic design 210 of FIG. 2) increasing the displacement 760 may correspond to a more significant difference between "true" and "false" positions in the cosmetic design. To further augment the displacement, the example electroactive polymer cell stack 750 may be physically constrained in one or more axial directions (e.g., x or y), such that the force of expansion is directed substantially in one direction.

In some embodiments, the displacement 760 between morphologies may be about 0.1 mm or greater, about 0.2 mm or greater, about 0.3 mm or greater, about 0.4 mm or greater, about 0.5 mm or greater, about 0.6 mm or greater, about 0.7 mm or greater, about 0.8 mm or greater, about 0.9 mm or greater, about 1.0 mm or greater, about 1.5 mm or greater, about 2.0 mm or greater, about 2.5 mm or greater, about 3.0 mm or greater, about 3.5 mm or greater, about 4.0 mm or greater, about 4.5 mm or greater, about 5.0 mm or greater, about 5.5 mm or greater, about 6.0 mm or greater, about 6.5 mm or greater, about 7.0 mm or greater, about 7.5 mm or greater, about 8.0 mm or greater, about 8.5 mm or greater, about 9.0 mm or greater, about 9.5 mm or greater, or about 10.0 mm or greater, including fractions and interpolations thereof (e.g., 1.3 mm, 3.7 mm, 5.1 mm, etc). In this context, the term "about" is used to refer to a value within 10% of the stated value.

Figure 8:
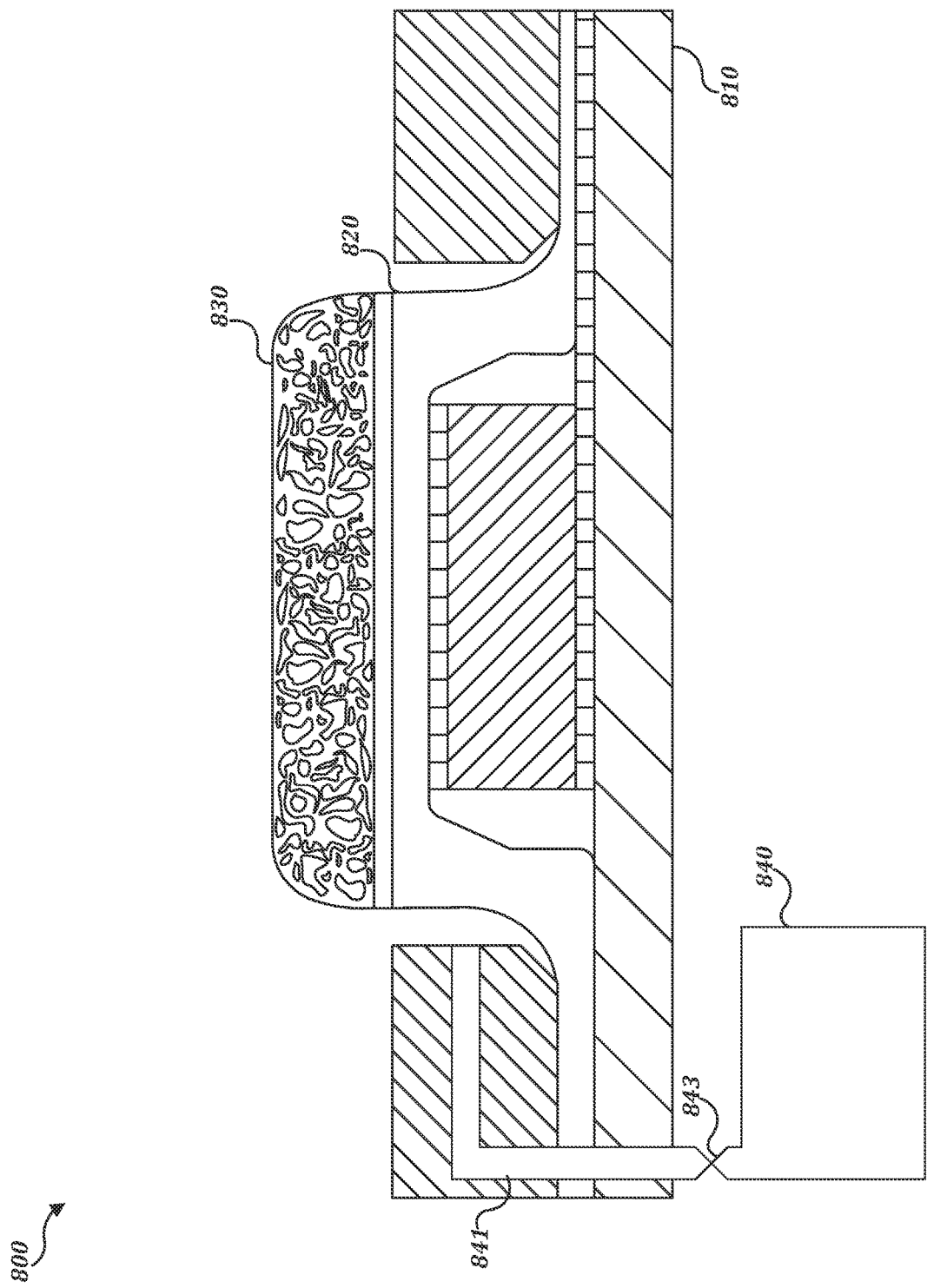
FIG. 8 is a schematic illustration of an example applicator element including an absorbent material and a pigment reservoir, in accordance with various embodiments.

FIG. 8 is a schematic illustration of an example applicator element 800 including an absorbent material and a pigment reservoir, in accordance with various embodiments. The example applicator element 800 may be an example of the applicator elements 231 of FIG. 2, applicator elements 331 of FIG. 3, applicator elements 460 of FIG. 4, applicator element 500 of FIG. 5, and/or applicator element 600 of FIG. 6. As illustrated, the example applicator element 800 includes the electrical components of the applicator element providing displacement upon application of a voltage, as described in more detail in reference to FIGS. 7A-7C (e.g., first electrode(s) 705, electroactive polymer layer(s) 710, second electrode(s) 715), disposed on a substrate 810 underlying an applicator surface 820.

The applicator surface 820 of the example applicator element 800 includes a porous material 830 disposed on at least a portion of the applicator surface 820. For example, the porous material 830 may be disposed on a region of the applicator surface 820 that corresponds to the position of the electrical components, such that the porous material 830 may be positioned closest to a target surface when the example applicator element 800 is in the raised position.

In some embodiments, the applicator array device also incorporates a pigment reservoir 840. The pigment reservoir 840 may be fluidly coupled with the applicator surface 830, for example, through one or more conduits 841. The conduit (s) 841 may include control circuitry, such as valves 843 to controllably release pigment from the pigment reservoir 840 onto the porous material 830. Additionally and/or alternatively, the applicator array device 840 may incorporate or include multiple pigment reservoirs 840, as part of controllably providing pigment to one or more applicator elements of the applicator array.

In this way, the example applicator element 800 may saturate the porous material 830 using a liquid pigment from the pigment reservoir 840. The applicator array device, provided with the pigment reservoir 840 and/or the porous material 830, may serve as both the applicator array device (e.g., applicator array device 110 of FIG. 1) and the pigment applicator (e.g., applicator array device 120 of FIG. 1). In some embodiments, the example applicator array element 800 does not include the porous material 830 but does include the components for applying pigment to the applicator surface 820, such as the reservoir 840, the conduit 841, and/or the valve 843.

In an illustrative example, the applicator array device may receive a cosmetic design from a client computing device (e.g., client computing device 130 of FIG. 1), may return all applicator elements that together define the applicator array to a neutral or recessed position, such that the applicator surface 820 may be fluidly coupled with the conduit 841, may open the valve 843 corresponding to the example applicator element 800, may drive a volume of liquid pigment from the pigment reservoir 840 to be absorbed by the porous material 830, and finally may initialize the example array element 800 by raising the applicator surface 820 into the raised position.

Figure 9:
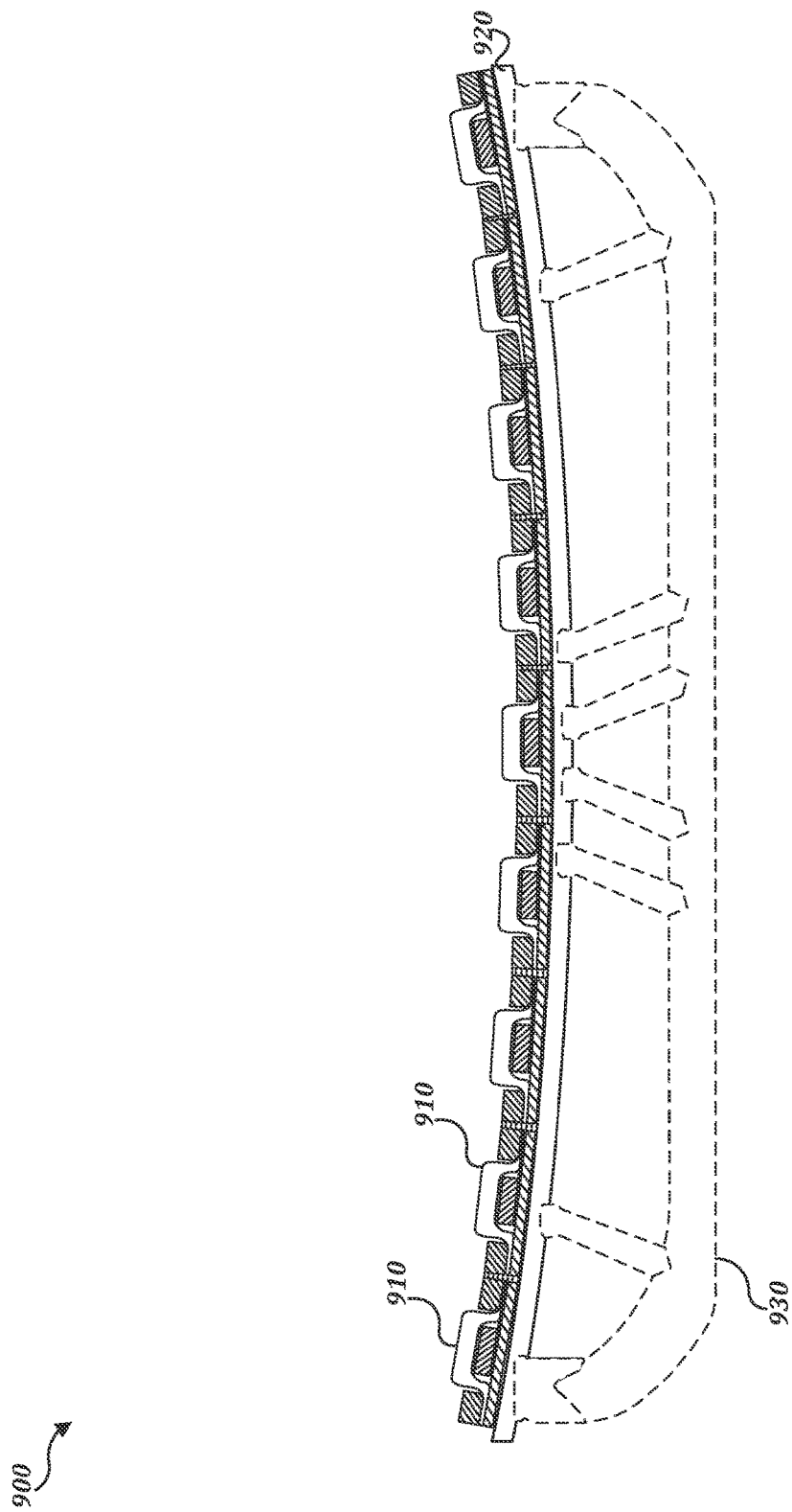
FIG. 9 is a schematic illustration of an example applicator array formed on a flexible substrate from flexible materials, in accordance with various embodiments.

FIG. 9 is a schematic illustration of an example applicator array 900 formed on a flexible substrate from flexible materials, in accordance with various embodiments. The example applicator array 900 may be an example of the applicator array 111 of FIG. 1, the applicator array 230 of FIG. 2, the applicator array 330 of FIG. 3, and/or the example applicator array 400 of FIG. 4. The example applicator array 900 may include multiple applicator array elements 910, which may be examples of the applicator elements 231 of FIG. 2, applicator elements 331 of FIG. 3, applicator elements 460 of FIG. 4, example applicator element 500 of FIG. 5, example applicator element 600 of FIG. 6, and/or example applicator element 800 of FIG. 8. The applicator elements 910 may be disposed on a flexible substrate 920, which may be or include a flexible circuit board (e.g., a polymer or otherwise flexible PCB incorporating flexible conductive traces), such that the example applicator array 900 may flexibly conform to contours of a surface (e.g., target body surface 181 of FIG. 1, surface 211 of FIG. 2, etc). In some embodiments, the substrate 920 may be or include multiple rigid segments mechanically coupled by flexible joints, such that the flexibility of the substrate 920 is facilitated through articulation of the multiple rigid segments.

To facilitate the flexing of the substrate 920, the example applicator array 900 may be coupled to a support structure 930. The support structure may permit the example applicator array 900 to flex in multiple directions and to conform to contoured surfaces in three spatial dimensions. The support structure 930 is illustrated in section to illustrate concave flexibility of the substrate 920. In some embodiments, the substrate 920 flexes in a convex shape, in both a concave and convex shape, in a saddle shape, as well as other compound curves that correspond to the target surface.

Figure 10:
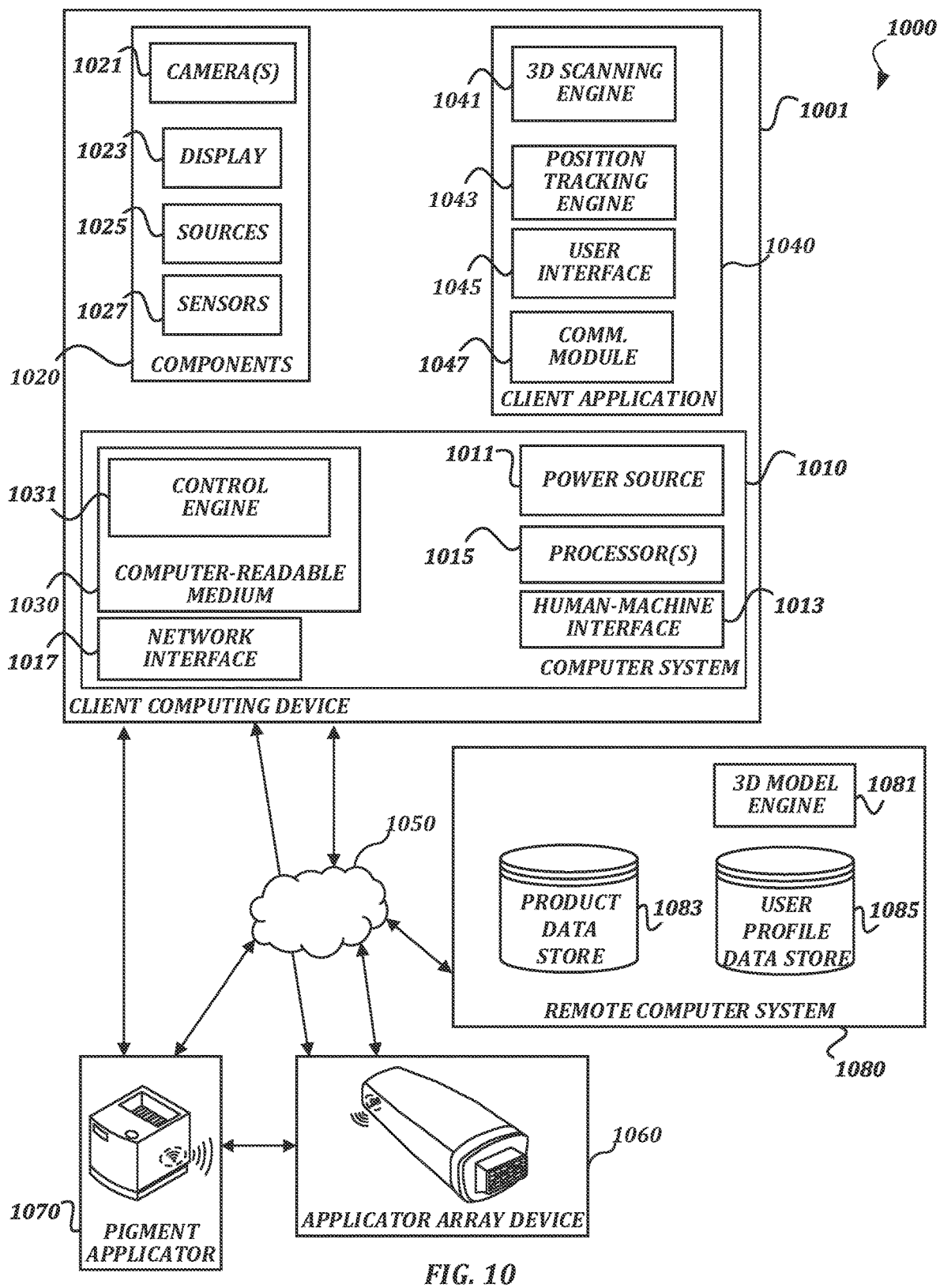
FIG. 10 is a block diagram that illustrates an example system, including components of the system of FIG. 1, in accordance with various embodiments.

FIG. 10 is a block diagram that illustrates an example system 1000, including components of the system of FIG. 1, in accordance with various embodiments. The example system 1000 may include a client computing device 1001 in electronic communication (e.g., over a network 1050) with an applicator array device 1060, a pigment applicator 1070, and a remote computer system 1080. Example system 1000 illustrates an example of the system 100 of FIG. 1, in a context of associated system elements, and, as such, describes electronics and software executing operations as described in reference to FIGS. 2-3. FIG. 10 depicts a non-limiting example of system elements, features and configurations; many other features and configurations are contemplated. In the example shown in FIG. 10, the client computing device 1001 (e.g., client computing device 104 of FIG. 1) includes a computer system 1010, multiple components 1020 for interacting with the user and for generating cosmetic designs and for facilitating application of the cosmetic design onto a target surface (e.g., surface 211 of FIG. 2), a computer-readable medium 1030, and a client application 1040, that may be stored as computer-executable instructions on the computer-readable medium 1030, and, when executed by the computer system 1010, may implement the operations described in reference to the system 100 of FIG. 1, and the operations of the example techniques of FIGS. 2-3.

The client computing device 1001 incorporates subcomponents including, but not limited to, a power source 1011, a human-machine interface device 1013, one or more processors 1015, a network interface 1017, and may include the computer-readable medium 1030. The power source 1011 is a direct-current power source, for example, a rechargeable battery or a rectified power supply configured to connect to line-power (e.g., 110 VAC, 220 VAC, etc.). The human-machine interface (HMI) 1013 may include any type of device capable of receiving user input or generating output for presentation to a user, such as a speaker for audio output, a microphone for receiving audio commands, a push-button switch, a toggle switch, a capacitive switch, a rotary switch, a slide switch, a rocker switch, or a touch screen.

The one or more processors 1015 are configured to execute computer-executable instructions stored on the computer-readable medium 1030. In an embodiment, the processor(s) 1015 are configured to receive and transmit signals to and/or from the components 1020 via a communication bus or other circuitry, for example, as part of executing the client application 1040. The network interface 1017 is configured to transmit and receive signals to and from the client computing device 1001 (or other computing devices) on behalf of the processors 1015. The network interface 1017 may implement any suitable communication technology, including but not limited to short-range wireless technologies such as Bluetooth, infrared, near-field communication, and Wi-Fi; long-range wireless technologies such as WiMAX, 2G, 3G, 4G, LTE, and 10G; and wired technologies such as USB, FireWire, Thunderbolt, and/or Ethernet. The computer-readable medium 1030 is any type of computer-readable medium on which computer-executable instructions may be stored, including but not limited to a flash memory (SSD), a ROM, an EPROM, an EEPROM, and an FPGA. The computer-readable medium 1030 and the processor(s) 1015 may be combined into a single device, such as an ASIC, or the computer-readable medium 1030 may include a cache memory, a register, or another component of the processor 1015.

In the illustrated embodiment, the computer-readable medium 1030 has computer-executable instructions stored thereon that, in response to execution by one or more processors 1015, cause the client computing device 1001 to implement a control engine 1031. The control engine 1031 controls one or more aspects of the client computing device 1001, as described above. In some embodiments, the computer-executable instructions are configured to cause the client computing device 1001 to perform one or more operations such as generating a surface mapping of the target surface, generating a cosmetic design, or providing the cosmetic design to an applicator array device and/or a pigment applicator. In some embodiments, the control engine 1031 controls basic functions by facilitating interaction between the computer system 1010 and the components 1020 according to the client application 1040. In some embodiments, the control engine 1031 detects input from HMI 1013 indicating that a cosmetic routine is to be initiated (e.g., in response to activation of a power switch or "start" button, or detection of a face in front of the mirror 106 of FIG. 1), or receives signals from the applicator array device 1060, the pigment applicator 1070, or the remote computer system 1080 (e.g., over a Bluetooth paired connection).

The components of the client computing device 1001 may be adapted to the application or may be specific to the application of configuring applicator array devices to apply cosmetic designs. For example, the components 1020 may include one or more cameras 1021, a display 1023, one or more illumination sources 1025, and/or one or more sensors 1027, as described in more detail in reference to FIG. 1. In some embodiments, the components 1020 are integrated into a single device such that the client computing device 1001 or at least of portion of the elements of the client computing device 1001 take on the appearance of a unitary cosmetic device. In this way, the client computing device 1001 may be a specialized computing device, configured to execute the client application 1040 in coordination with the components 1020.

In some embodiments, the client application 1040 also includes an image capture/3D scanning engine 1041 configured to capture and process digital images (e.g., color images, infrared images, depth images, etc.) obtained from one or more of the components 1020 including but not limited to stereoscopic images, LiDAR data, or other forms of surface/depth sensing information. In an embodiment, such data are used to obtain a clean and precise 3D contour mapping of the target body surface (e.g., target surface 181 of FIG. 1). In some embodiments, the digital images or scans are processed by the client computing device 1001 and/or transmitted to the remote computer system 1080 for processing in a 3D model engine 1081. In an embodiment, captured image data is used in position tracking engine 1043 for determining the position of features, key-points, or edges on the target body surface. In some embodiments, the position tracking engine 1043 tracks the contours of the target body surface in a 3D space, for example, by implementing v-SLAM techniques. In some embodiments, position information from the position tracking engine 1043 is used to generate signals to be transmitted to the control engine 1031, which are used to control one or more components 1020 or elements of the computer system 1010 including, for example, the sources 1025 or the HMI 1013, according to techniques described herein.

In some embodiments, digital 3D models described herein are generated based on sensor data obtained the client computing device 1001. As such, the digital 3D models are generated by the client computing device 1001 or some other computing device, such as a remote cloud computing system, or a combination thereof. In some embodiments, the digital 3D models include 3D topology and texture information, which can be used for reproducing an accurate representation of a body surface, such as facial structure and skin features, as described in more detail in reference to FIGS. 1-2.

In some embodiments, the client application 1040 includes a user interface 1045. In an embodiment, the user interface 1045 includes interactive functionality including but not limited to graphical guides or prompts, presented via the display to assist a user in selecting cosmetic designs, tutorial videos, or animations. Visual elements of the user interface 1045 also may be presented via a display of the applicator array device 1060 and/or the pigment applicator 1070. In some embodiments, the user interface 1045 provides guidance (e.g., visual guides such as arrows or targets, progress indicators, audio/haptic feedback, synthesized speech, etc.) to guide a user under particular lighting conditions, angles, etc., in order to ensure that sufficient data is collected for use by mapping and projection engines.

The client application 1040 may include a source steering module 1047. The source steering module 1047 may be or include computer-readable instructions (e.g., software, drivers, etc.) for translating a numerical representation of an exposure pattern into intensity and direction data to drive the sources 1025. For example, while the control engine 1031 may service communication between the various components of the client computing device 1001, specific drive signals may be generated by the source steering module 1047. As part of the operation of the source steering module 1047, the client application may receive real-time data from the camera(s) 1021 and sensors 1027, which may be processed by the 3D scanning engine 1041, the position tracking engine 1043, and may used to progressively update the mapping and the cosmetic design. In this way, the source steering module 1047 may respond to motion of the target body surface, thereby increasing the tolerance of the client computing device 1001 for motion on the part of the user without loss of fidelity to the cosmetic design. In some embodiments, the computational resource demand for such real time scanning/tracking, may be spread across multiple devices, such as the applicator array device 1060, the pigment applicator 1070, and/or the remote computer system 1080, through parallelization or distribution routines.

A communication module 1047 of the client application 1040 may be used to prepare information for transmission to, or to receive and interpret information from other devices or systems, such as the applicator array device 1060, the pigment applicator 1070, and/or the remote computer system 1080, As described in more detail in reference to FIG. 1. Such information may include captured digital images, scans, or video, personal care device settings, custom care routines, user preferences, user identifiers, device identifiers, or the like. In an embodiment, the client computing device 1001 collects data describing execution of care routines, image data of body surfaces, or other data. In an embodiment, such data is transmitted via the network interface 1017 to the remote computer system 1080 for further processing or storage (e.g., in a product data store 1083 or user profile data store 1085). The client computing device 1001 may be used by a consumer, personal care professional, or some other entity to interact with other components of the system 1000, such as the applicator array device 1060, the pigment applicator 1070, and/or the remote computer system 1080. In an embodiment, the client computing device 1001 is a mobile computing device such as a smartphone or a tablet computing device equipped with the components 1020 and the client application 1040 or provided with the components through electronic coupling with a peripheral device.

Illustrative components and functionality of the remote computer system 1080 will now be described. The remote computer system 1080 includes one or more server computers that implement one or more of the illustrated components, e.g., in a cloud computing arrangement. The remote computer system 1080 includes a projection engine 1087, the 3D model engine 1081, the product data store 1083, and the user profile data store 1085. In an embodiment, the 3D model engine 1081 uses image data (e.g., color image data, infrared image data) and depth data to generate a 3D model of the target body surface. The image data is obtained from the client computing device 1001, for example, from the camera(s) 1021 or the sensor(s) 1027 that are integrated with or otherwise electronically coupled with client computing device 1001. In an embodiment, image data and depth data associated with a user is stored in the user profile data store 1085. In an embodiment, user consent is obtained prior to storing any information that is private to a user or can be used to identify a user.

In an embodiment, the mapping/projection engine 1087 performs processing of data relating to a cosmetic routine, such as generating mappings of target surfaces using image/sensor data and/or generating a projection of the cosmetic designs routine, which can then be transmitted to the client computing device 1001. The cosmetic routine information may include, for example, programmatic exposure pattern instructions for illuminating the target body surface that may be provided as instructions to be executed by the control engine 1031, by the client application 1040, or by the sources 1025 directly.

In some embodiments, the projection engine 1087 generates cosmetic design data using user information from the user profile data store 1085, the product data store 1083, the 3D model engine 1081, or some other source or combination of sources. The 3D model engine 1081 may employ machine learning or artificial intelligence techniques (e.g., template matching, feature extraction and matching, classification, artificial neural networks, deep learning architectures, genetic algorithms, or the like). For example, to generate the cosmetic design in accordance with a surface mapping of a face, the projection engine 1087 may analyze a facial mapping generated by the 3D model engine 1081 to measure or map contours, wrinkles, skin texture, etc., of the target body surface (e.g., subject's face 102 of FIG. 1). The projection engine 1087 may receive data describing a cosmetic design based on an identifier code provided by the user through the applicator array device 1060, the pigment applicator 1070, and/or directly from the client computing device 1001. In such a scenario, the projection engine 1087 may use such information to generate a projection of the cosmetic design (e.g., cosmetic design 210 of FIG. 2) onto the target body surface.

The devices shown in FIG. 10 may communicate with each other via a network 1050, which may include any suitable communication technology including but not limited to wired technologies such as DSL, Ethernet, fiber optic, USB, Firewire, Thunderbolt; wireless technologies such as WiFi, WiMAX, 3G, 4G, LTE, 5G, 10G, and Bluetooth; and private networks (e.g., an intranet) or public networks (e.g., the Internet). In general, communication between computing devices or components of FIG. 10, or other components or computing devices used in accordance with described embodiments, occur directly or through intermediate components or devices.

Many alternatives to the arrangements disclosed and described with reference to FIGS. 1 and 10, are possible. For example, functionality described as being implemented in multiple components may instead be consolidated into a single component, or functionality described as being implemented in a single component may be implemented in multiple illustrated components, or in other components that are not shown in FIG. 1 or 10. As another example, devices in FIGS. 1 and 10 that are illustrated as including particular components may instead include more components, fewer components, or different components without departing from the scope of described embodiments. As another example, functionality that is described as being performed by a particular device or subcomponent may instead be performed by one or more other devices within a system. As an example, the 3D model engine 1014 may be implemented in client computing device 1001 or in some other device or combination of devices.

In addition to the technical benefits of described embodiments that are described elsewhere herein, numerous other technical benefits are achieved in some embodiments. For example, the system 1000 allows some aspects of the process to be conducted independently by personal care devices or client computing devices, while moving other processing burdens to the remote computer system 1010 (which may be a relatively high-powered and reliable computing system), thus improving performance and preserving battery life for functionality provided by personal care devices or client computing devices.

In general, the word "engine," as used herein, refers to logic embodied in hardware or software instructions written in a programming language, such as C, C++, COBOL, JAVA™, PHP, Perl, HTML, CSS, JavaScript, VBScript, ASPX, Microsoft .NET™, and/or the like. An engine may be compiled into executable programs or written in interpreted programming languages. Software engines may be callable from other engines or from themselves. Generally, the engines described herein refer to logical modules that can be merged with other engines or divided into sub-engines. The engines can be stored in any type of computer-readable medium or computer storage device and be stored on and executed by one or more general purpose computers, thus creating a special purpose computer configured to provide the engine or the functionality thereof.

As understood by one of ordinary skill in the art, a "data store" as described herein may be any suitable device configured to store data for access by a computing device. One example of a data store is a highly reliable, high-speed relational database management system (DBMS) executing on one or more computing devices and accessible over a high-speed network. Another example of a data store is a key-value store. However, any other suitable storage technique and/or device capable of quickly and reliably providing the stored data in response to queries may be used, and the computing device may be accessible locally instead of over a network, or may be provided as a cloud-based service. A data store may also include data stored in an organized manner on a computer-readable storage medium, as described further below. One of ordinary skill in the art will recognize that separate data stores described herein may be combined into a single data store, and/or a single data store described herein may be separated into multiple data stores, without departing from the scope of the present disclosure.

Figure 11:
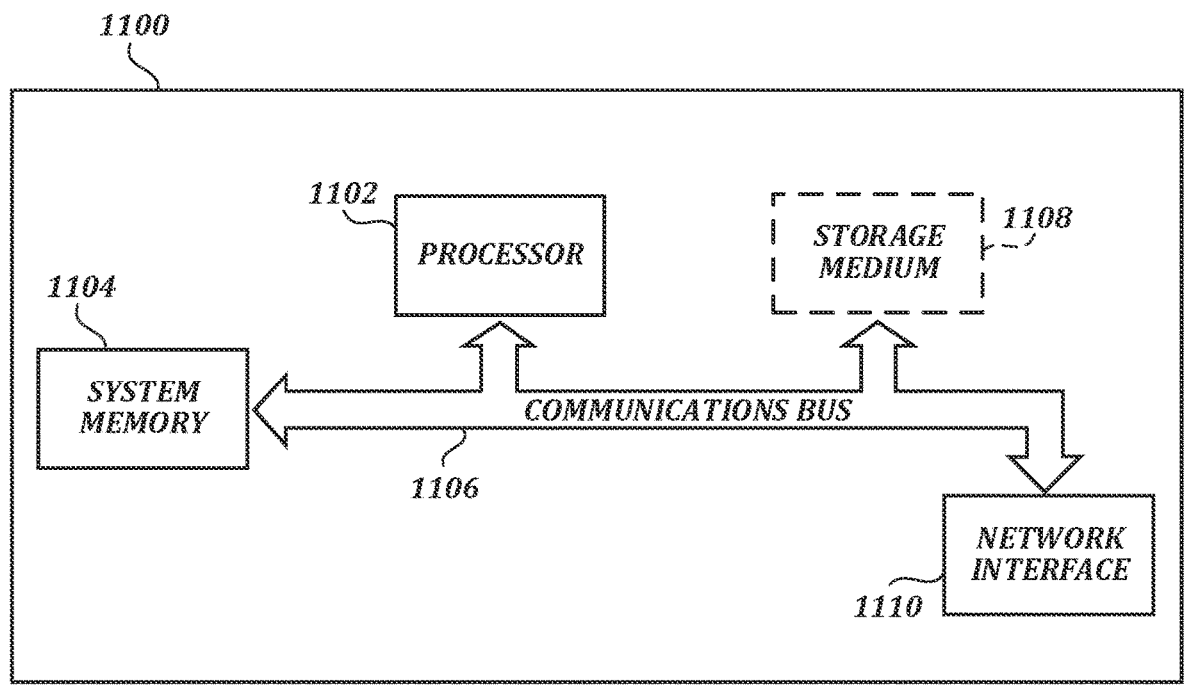
FIG. 11 is a block diagram that illustrates aspects of an example computing device, in accordance with various embodiments.

FIG. 11 is a block diagram that illustrates aspects of an example computing device 1100, in accordance with various embodiments. While multiple different types of computing devices are described in reference to the various embodiments, the example computing device 1100 describes various elements that are common to many different types of computing devices. While FIG. 11 is described with reference to a computing device that is implemented as a device on a network, the description below is applicable to servers, personal computers, mobile phones, smart phones, tablet computers, embedded computing devices, and other devices that may be used to implement portions of embodiments of the present disclosure. Moreover, those of ordinary skill in the art and others will recognize that the computing device 1100 may be any one of any number of currently available or yet to be developed devices.

In its most basic configuration, the example computing device 1100 includes at least one processor 1102 and a system memory 1104 connected by a communication bus 1106. Depending on the exact configuration and type of device, the system memory 1104 may be volatile or non-volatile memory, such as read only memory ("ROM"), random access memory ("RAM"), EEPROM, flash memory, or similar memory technology. Those of ordinary skill in the art and others will recognize that system memory 1104 typically stores data and/or program modules that are immediately accessible to and/or currently being operated on by the processor 1102. In this regard, the processor 1102 may serve as a computational center of the computing device 1100 by supporting the execution of instructions.

As further illustrated in FIG. 11, the computing device 1100 may include a network interface 1110 comprising one or more components for communicating with other devices over a network. Embodiments of the present disclosure may access basic services that utilize the network interface 1110 to perform communications using common network protocols. The network interface 1110 may also include a wireless network interface configured to communicate via one or more wireless communication protocols, such as WiFi, 2G, 3G, LTE, WiMAX, Bluetooth, Bluetooth low energy, and/or the like. As will be appreciated by one of ordinary skill in the art, the network interface 1110 illustrated in FIG. 11 may represent one or more wireless interfaces or physical communication interfaces described and illustrated above with respect to particular components of the system 100 of FIG. 1.

In the exemplary embodiment depicted in FIG. 11, the computing device 1100 also includes a storage medium 1108. However, services may be accessed using a computing device that does not include means for persisting data to a local storage medium. Therefore, the storage medium 1108 depicted in FIG. 11 is represented with a dashed line to indicate that the storage medium 1108 is optional. In any event, the storage medium 1108 may be volatile or nonvolatile, removable or nonremovable, implemented using any technology capable of storing information including, but not limited to, a hard disk drive, solid state drive, CD ROM, DVD, or other disk storage, magnetic cassettes, magnetic tape, magnetic disk storage, and/or the like.

As used herein, the term "computer-readable medium" includes volatile and non-volatile and removable and non-removable media implemented in any method or technology capable of storing information, such as computer readable instructions, data structures, program modules, or other data. In this regard, the system memory 1104 and storage medium 1108 depicted in FIG. 11 are merely examples of computer-readable media.

Suitable implementations of computing devices that include a processor 1102, system memory 1104, communication bus 1106, storage medium 1108, and network interface 1110 are known and commercially available. For ease of illustration and because it is not important for an understanding of the claimed subject matter, FIG. 11 does not show some of the typical components of many computing devices. In this regard, the example computing device 1100 may include input devices, such as a keyboard, keypad, mouse, microphone, touch input device, touch screen, and/or the like. Such input devices may be coupled to the example computing device 1100 by wired or wireless connections including RF, infrared, serial, parallel, Bluetooth, Bluetooth low energy, USB, or other suitable connections protocols using wireless or physical connections. Similarly, the example computing device 1100 may also include output devices such as a display, speakers, printer, etc. Since these devices are well known in the art, they are not illustrated or described further herein.

While illustrative embodiments have been illustrated and described, it will be appreciated that various changes can be made therein without departing from the spirit and scope of the invention. It is to be understood that the methods and systems described herein are not limited to specific methods, specific components, or to particular implementations. It is also to be understood that the terminology used herein is for the purpose of describing embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

The invention claimed is:

1. An applicator array device, comprising:
   a substrate;
   a plurality of applicator elements disposed on the substrate, together defining an applicator array, each applicator element comprising:

a first electrode;
an electroactive polymer layer disposed on the first electrode; and
a second electrode, disposed on the electroactive polymer layer; and
an applicator surface overlying the applicator array;
wherein each applicator element is configured to switch between a first position and a second position upon application of a voltage to the first electrode or the second electrode, or upon removal of the voltage from the first electrode or the second electrode.

2. The applicator array device of claim 1, wherein the applicator surface comprises a perforated screen comprising a plurality of windows corresponding to the plurality of applicator elements, the perforated screen having a thickness whereby the applicator elements are recessed below an outer surface of the perforated screen at the first position and are proud of the outer surface when at the second position.

3. The applicator array device of claim 1, wherein the plurality of applicator elements is disposed on a first side of the substrate, wherein the applicator array comprises a plurality of pistons operably coupled to the plurality of applicator elements and extending through the substrate, wherein the applicator surface comprises a flexible layer disposed on a second side of the substrate and overlying the plurality of pistons and the substrate, and wherein each applicator element is configured to switch from the first position to the second position upon application of the voltage.

4. The applicator array device of claim 1, wherein the substrate comprises a flexible material, and wherein the first electrode and the second electrode comprise flexible electronic traces.

5. The applicator array device of claim 1, wherein the applicator surface comprises a porous material disposed at a plurality of positions corresponding to the plurality of applicator elements, and wherein the applicator array device further comprises a pigment reservoir fluidly coupled with the applicator surface and configured to saturate the porous material using a liquid pigment from the pigment reservoir.

6. The applicator array device of claim 1, wherein each applicator element further comprises a plurality of electroactive polymer layers including the electroactive polymer layer, interleaved with a plurality of first electrodes including the first electrode and a plurality of second electrodes including the second electrode, together defining a stack of electroactive polymer cells.

7. The applicator array device of claim 1, further comprising:
one or more processors;
control circuitry in electronic communication with the one or more processors, the first electrode layer and the second electrode layer; and
a non-transitory computer readable memory in electronic communication with the one or more processors and storing instructions that, when executed by the one or more processors, cause the one or more processors to perform operations comprising:
receiving a design describing a configuration of the plurality of applicator elements, whereby a first subset of the applicator elements are in the first position and a second subset of the applicator elements are in the second position; and
initializing the plurality of applicator elements in accordance with the design, wherein initializing the plurality of applicator elements comprises applying the voltage to the first subset of the applicator elements or to the second subset of the applicator elements.

8. A system for application of cosmetic designs, the system comprising:
a client computing device configured to generate a cosmetic design;
an applicator array device according to claim 1, in electronic communication with the client computing device, configured to receive the cosmetic design from the client computing device and to initialize the plurality of applicator elements of the applicator array device in accordance with the cosmetic design; and
a pigment applicator configured to reversibly couple with the applicator array device and to apply a pigment to a subset of the plurality of applicator elements.

9. The system of claim 8 wherein the pigment applicator comprises control circuitry, communication circuitry, and a controllable pigment applicator head, wherein the pigment applicator is configured to electronically couple with the client computing device, and wherein the pigment applicator is configured to print the pigment onto the subset of the plurality of applicator elements, using the controllable pigment applicator head, in accordance with the cosmetic design.

10. The system of claim 9, wherein the applicator array device is further configured to receive the cosmetic design from the client computing device via an electronic coupling with the pigment applicator.

11. The system of claim 8, wherein the pigment comprises a bistable formulation, wherein the bistable formulation switches between a solid or viscous form and a liquid form when exposed to illumination at a characteristic energy.

12. The system of claim 8, further comprising a camera in communication with the client computing device, and wherein generating the cosmetic design comprises:
capturing an image describing a target body surface using the camera;
generating a surface mapping of the target body surface using the image; and
determining a subset of applicator elements of the plurality of applicator elements to switch from the first position to the second position.

* * * * *